(12) United States Patent
Tasaka et al.

(10) Patent No.: US 8,665,195 B2
(45) Date of Patent: Mar. 4, 2014

(54) LIQUID CRYSTAL DISPLAY DEVICE

(75) Inventors: Yasutoshi Tasaka, Osaka (JP); Kaori Saitoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 338 days.

(21) Appl. No.: 13/144,015

(22) PCT Filed: Jan. 8, 2010

(86) PCT No.: PCT/JP2010/000079
§ 371 (c)(1),
(2), (4) Date: Jul. 11, 2011

(87) PCT Pub. No.: WO2010/079760
PCT Pub. Date: Jul. 15, 2010

(65) Prior Publication Data
US 2012/0019437 A1    Jan. 26, 2012

(30) Foreign Application Priority Data
Jan. 9, 2009  (JP) .................................. 2009-004093

(51) Int. Cl.
G09G 3/36  (2006.01)

(52) U.S. Cl.
USPC .............. 345/87; 345/690; 345/698; 345/613

(58) Field of Classification Search
USPC ........... 345/87, 88, 94, 98, 173, 691, 99, 204, 345/613, 690, 698
See application file for complete search history.

(56) References Cited

U.S. PATENT DOCUMENTS

| 6,545,658 | B2 * | 4/2003 | Ohta et al. ...................... 345/98 |
| 6,661,488 | B1 | 12/2003 | Takeda et al. |
| 7,113,241 | B2 | 9/2006 | Hanaoka |
| 7,429,981 | B2 * | 9/2008 | Shimoshikiryoh ............ 345/204 |
| 8,203,520 | B2 * | 6/2012 | Shimoshikiryoh ............. 345/99 |
| 8,487,858 | B2 * | 7/2013 | Shimoshikiryoh ............. 345/99 |
| 2001/0022569 | A1 * | 9/2001 | Ohta et al. ....................... 345/88 |

(Continued)

FOREIGN PATENT DOCUMENTS

| JP | 11-242225 | 9/1999 |
| JP | 2003-149647 | 5/2003 |

(Continued)

OTHER PUBLICATIONS

International Search Report for PCT/JP2010/000079, mailed Jan. 8, 2010.

(Continued)

*Primary Examiner* — Thuy Pardo
(74) *Attorney, Agent, or Firm* — Nixon & Vanderhye, P.C.

(57) ABSTRACT

A liquid crystal display device includes an active matrix substrate including a plurality of pixel electrodes provided in a matrix of a plurality of rows by a plurality columns; a counter substrate including a counter electrode; a vertical alignment type liquid crystal layer; and axis-symmetrical liquid crystal domain formation portions each for forming a liquid crystal domain in which liquid crystal molecules in the liquid crystal layer are aligned in axis symmetry, the axis-symmetrical liquid crystal domain formation portions each being located at the center of the respective liquid crystal domain. The plurality of pixel electrodes each define a pixel area. The axis-symmetrical liquid crystal domain formation portions ; are each provided in correspondence with an area between two pixel areas defined by two pixel electrodes adjacent to each other.

17 Claims, 17 Drawing Sheets

(56) References Cited

U.S. PATENT DOCUMENTS

| | | | |
|---|---|---|---|
| 2004/0032384 A1* | 2/2004 | Ohta et al. | 345/87 |
| 2007/0097280 A1 | 5/2007 | Choi et al. | |
| 2009/0046048 A1* | 2/2009 | Shimoshikiryoh | 345/99 |

FOREIGN PATENT DOCUMENTS

| | | |
|---|---|---|
| JP | 2003-270653 | 9/2003 |
| JP | 2006-126228 | 5/2006 |
| JP | 2007-128094 | 5/2007 |
| JP | 2007-316234 | 12/2007 |

OTHER PUBLICATIONS

International Preliminary Report on Patentability mailed Aug. 25, 2011 in corresponding PCT Application No. PCT/JP2010/000079.

* cited by examiner

FIG.1
(a)
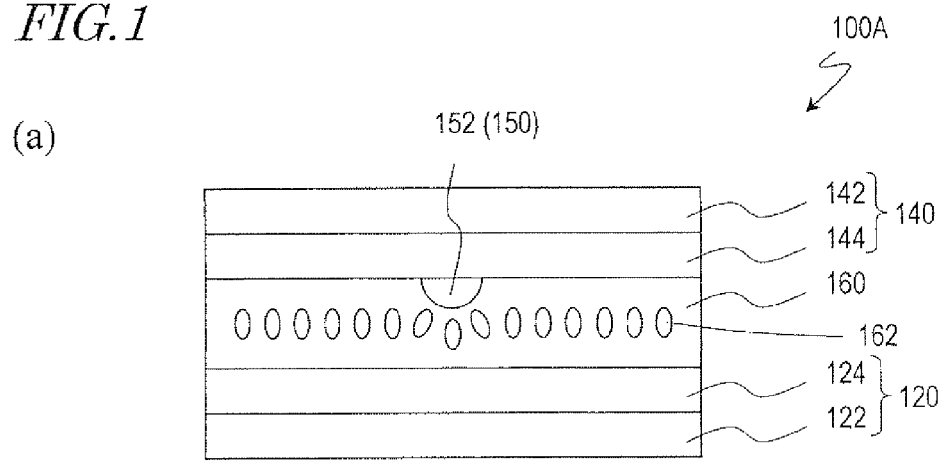
(b)
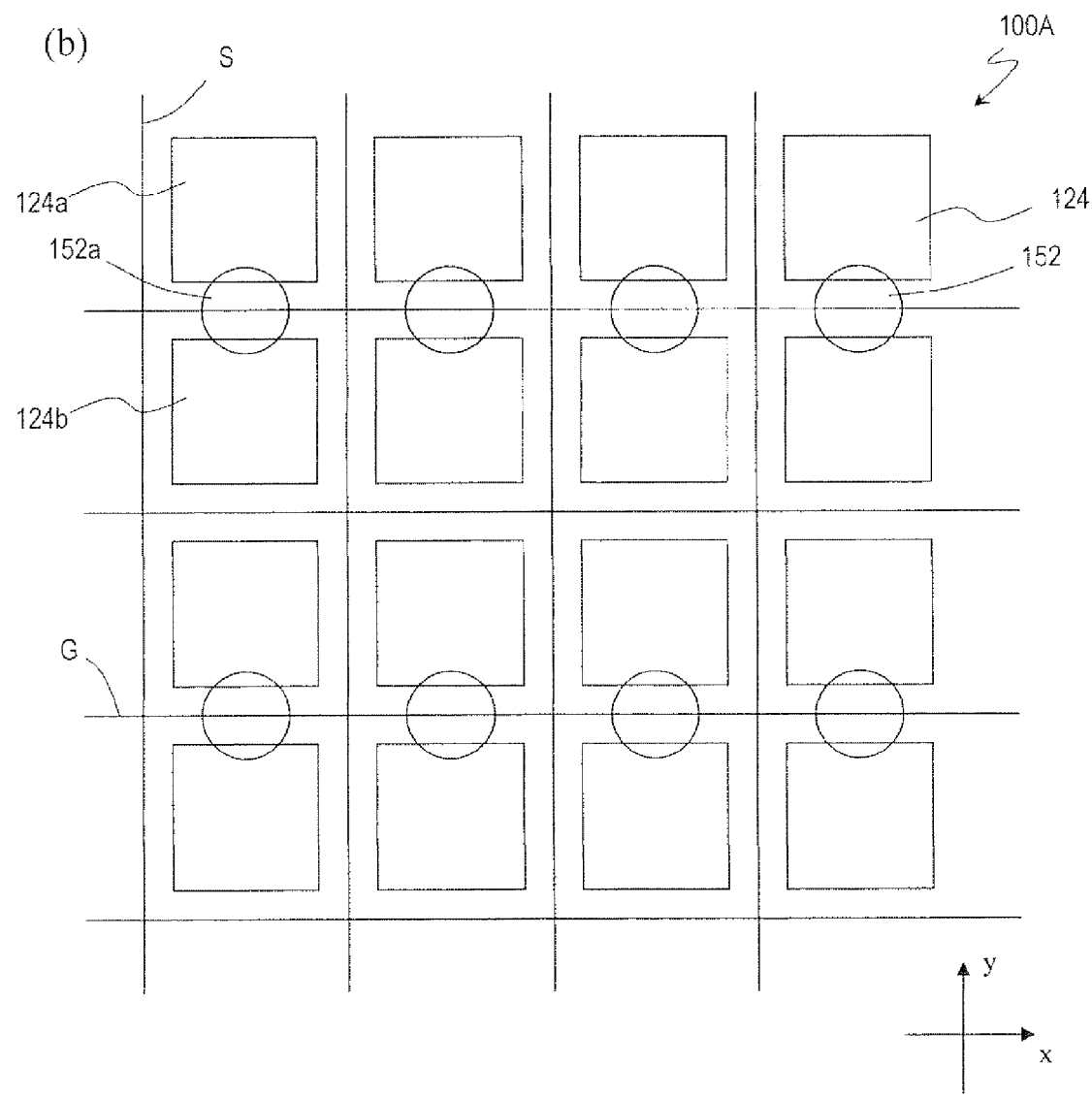

FIG.3
(a)
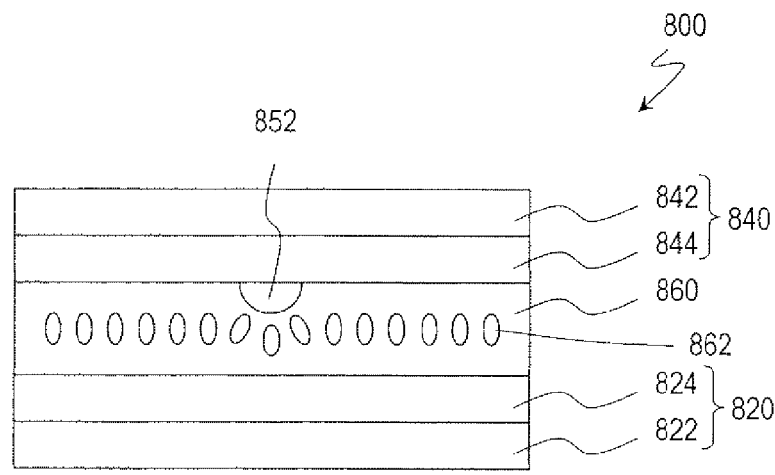
(b)
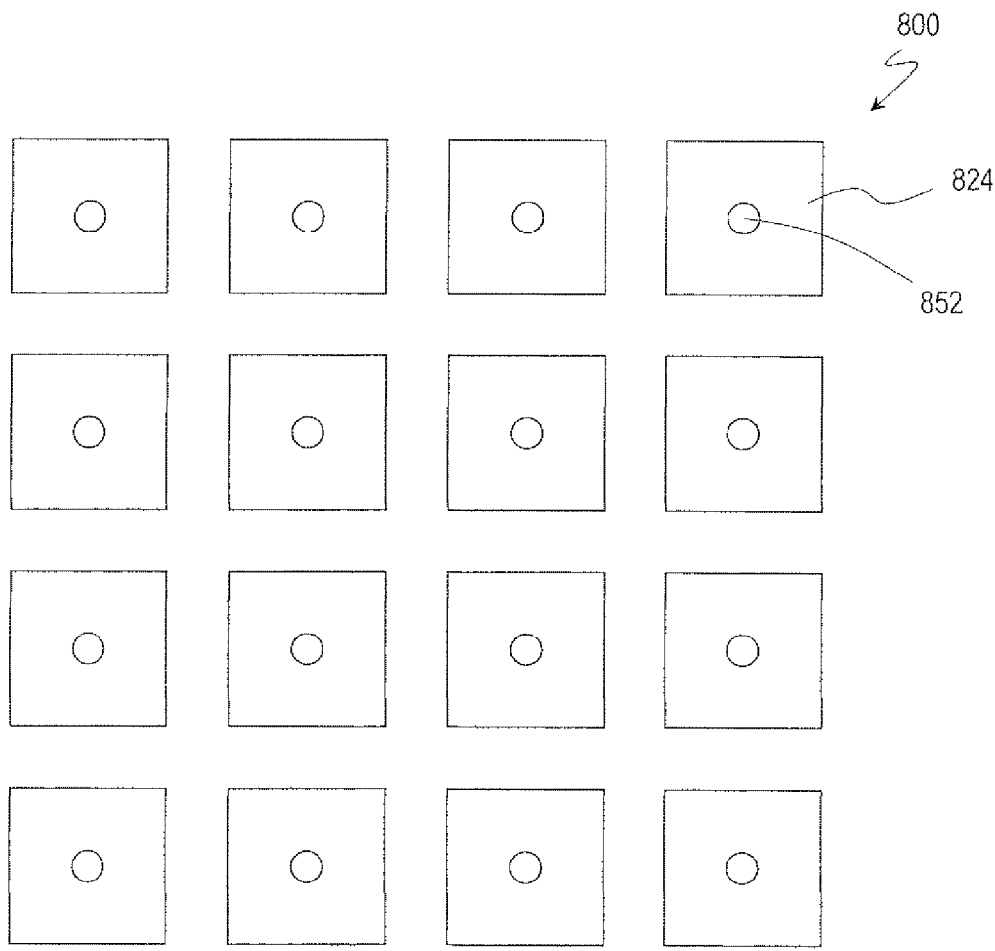

FIG.5
(a)
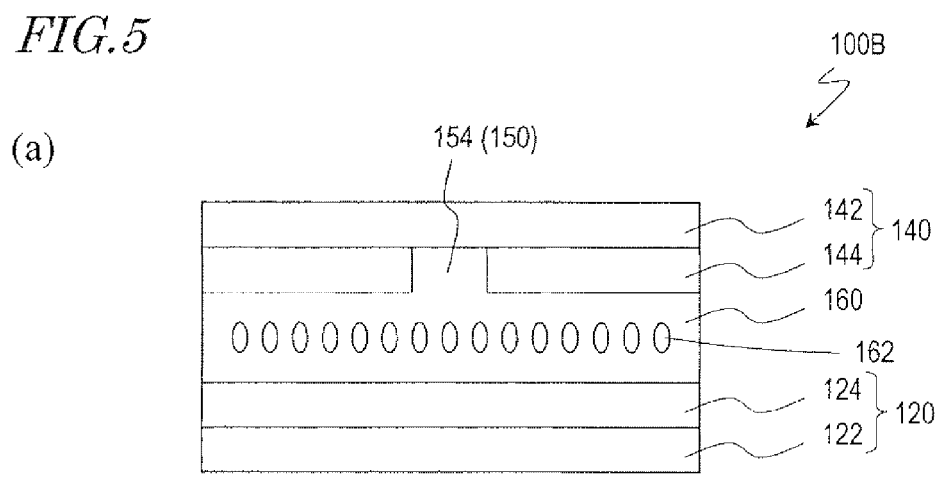
(b)
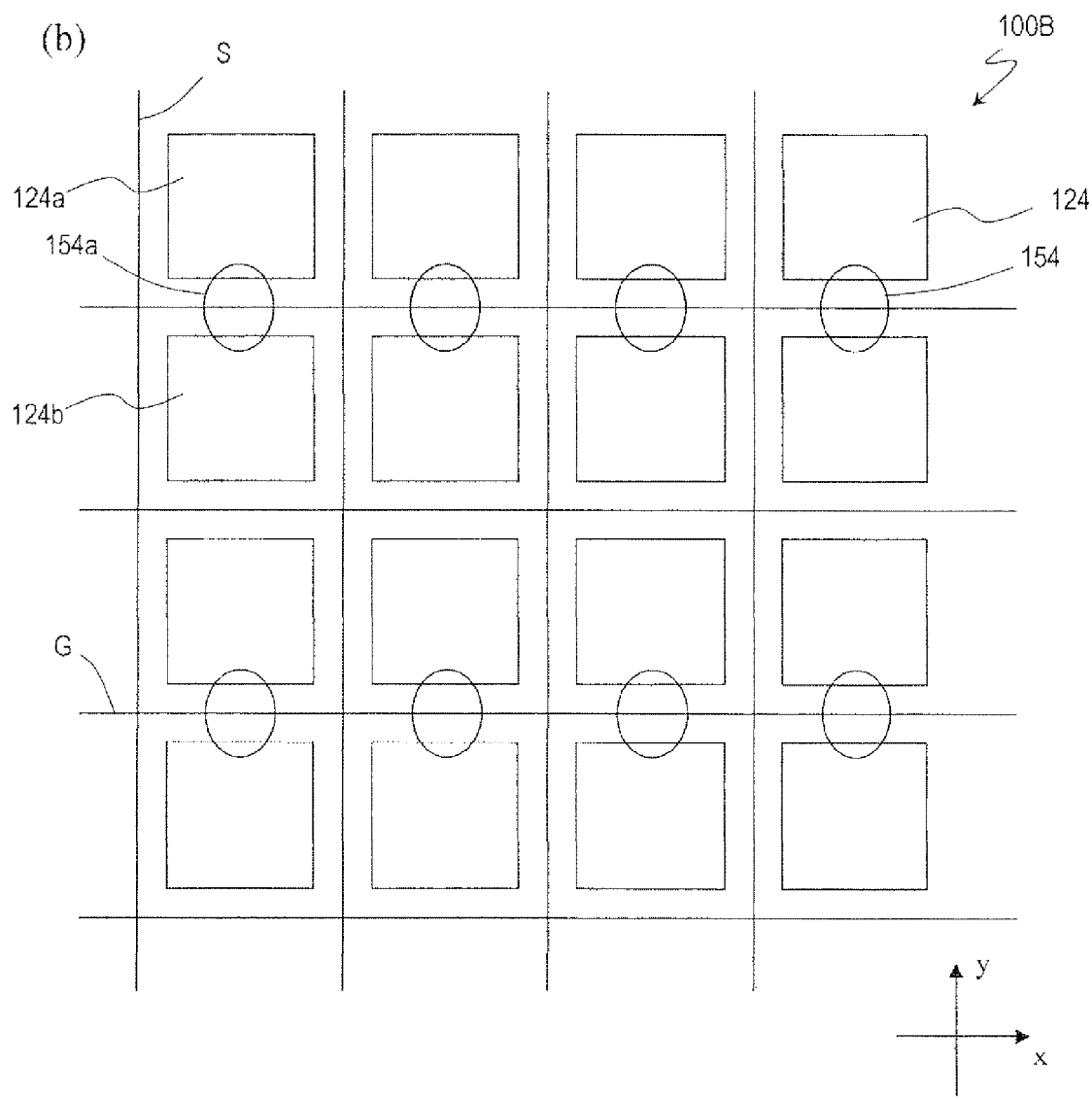

*FIG.14*
(a)
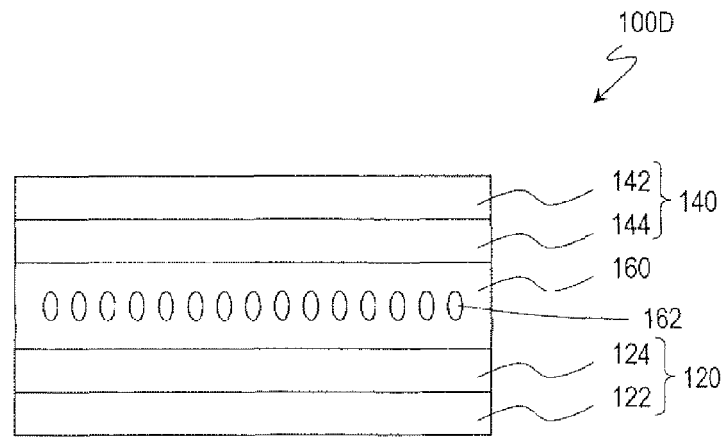
(b)
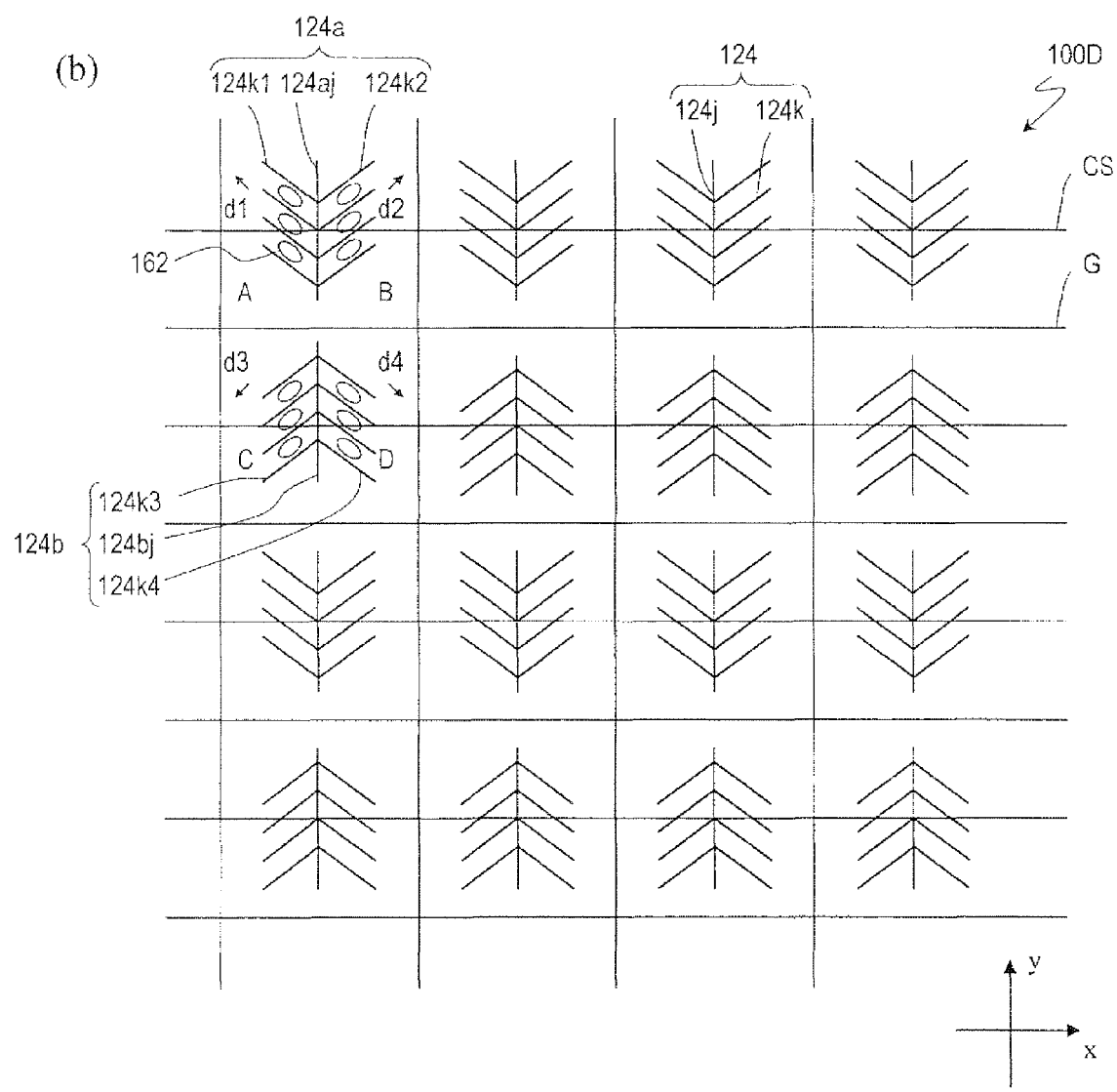

FIG.15
(a)
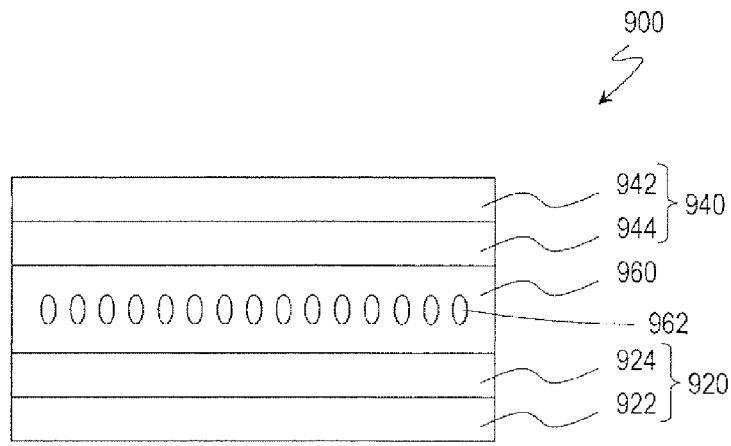
(b)
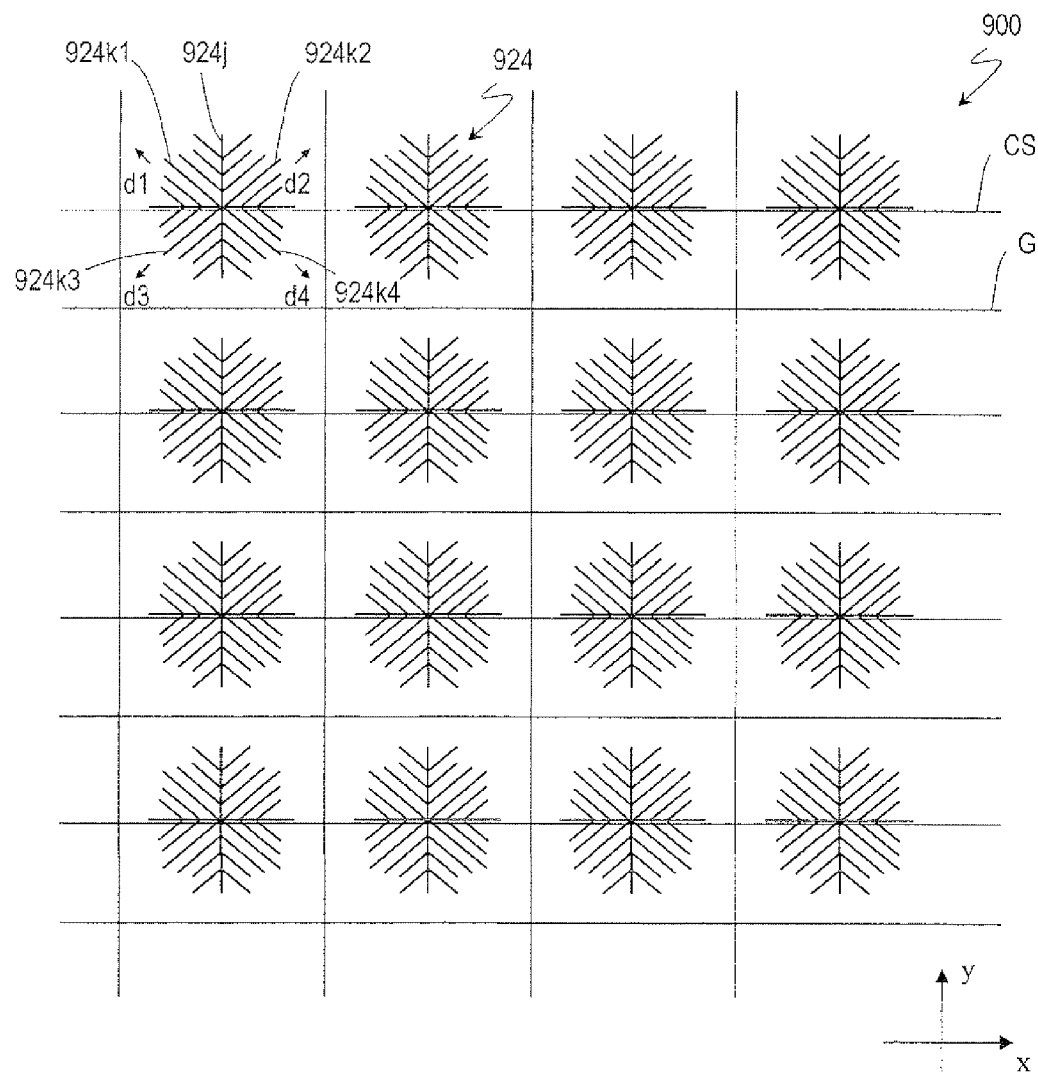

LIQUID CRYSTAL DISPLAY DEVICE

This application is the U.S. national phase of International Application No. PCT/JP2010/000079, filed 8 Jan. 2010, which designated the U.S. and claims priority to JP Application No. 2009-004093, filed 9 Jan. 2009, the entire contents of each of which are hereby incorporated by reference.

TECHNICAL FIELD

The present invention relates to a liquid crystal display device.

BACKGROUND ART

Liquid crystal display devices are used as, for example, small display devices such as display sections of mobile phones in addition to display sections of large-screen TVs. TN (Twisted Nematic) mode liquid crystal display devices often used conventionally have a relatively narrow viewing angle. Recently, however, wide viewing angle liquid crystal display devices of an IPS (In-Plane-Switching) mode, a VA (Vertical Alignment) mode and the like have been produced. Among such wide viewing angle modes, the VA mode can realize a high contrast ratio and so is adopted for many liquid crystal display devices.

As one type of VA mode, a CPA (Continuous Pinwheel Alignment mode is known. In a general CPA mode liquid crystal display device, pixel electrodes and unit electrodes having a highly symmetrical shape are provided, and also projections (convexed portions) or openings are provided in correspondence with the centers of the pixel electrodes or the unit electrodes. When a voltage is applied to a liquid crystal layer, liquid crystal molecules are tilt-aligned radially in accordance with an oblique electric field formed by a counter electrode and the highly symmetrical pixel electrodes or unit electrodes. Using the oblique electric field formed by an alignment regulating force of the inclined side surface of the convexed portions or by the openings, the tilted alignment of the liquid crystal molecules is stabilized. Thus, liquid crystal domains centering around the projections (convexed portions) or the openings are formed. In this manner, with a CPA mode liquid crystal display device, the liquid crystal molecules are aligned radially in an attempt to improve the viewing angle characteristics (see, for example, Patent Documents 1 through 3).

In a liquid crystal display device disclosed in Patent Document 1, pixel electrodes are provided in areas defined by gate lines and source lines, and the pixel electrodes each have a plurality of subpixel electrodes (unit electrodes) separated from each other. Storage capacitance lines extending parallel to the gate lines are provided in areas between the plurality subpixel electrodes. A counter electrode includes convexed portions in correspondence with the respective centers of the plurality of subpixel electrodes in an attempt to improve the viewing angle characteristics.

In a liquid crystal display device disclosed in Patent Document 2, pixel electrodes are provided so as to overlap gate lines, and storage capacitance lines extending parallel to the gate lines are each provided between two pixel electrodes adjacent to each other in a column direction. In the liquid crystal display device of Patent Document 2, the pixel electrodes each have a plurality of unit electrodes connected to each other, and a counter substrate includes convexed portions in correspondence with the respective centers of the unit electrodes.

Patent Document 3 discloses a transreflective liquid crystal display device. In the liquid crystal display device of Patent Document 3, a counter substrate includes convexed portions in correspondence with the respective centers of transmissive regions and reflective regions. In the liquid crystal display device of Patent Document 3, a liquid crystal layer is thicker in the reflective regions than in the transmissive regions. Owing to this, the retardation amount in the reflective regions is approximately equal to the retardation amount in the transmissive regions. In the liquid crystal display device of Patent Document 3, the convexed portions provided in the transmissive regions are higher than the convexed portions provided in the reflective regions. Owing to this, the alignment stability and the response speed of the liquid crystal molecules in the respective regions are improved.

As another type of VA mode, an MVA (Multi-domain Vertical Alignment) mode, by which a plurality of liquid crystal domains are formed in one pixel area, is also known. In an MVA mode liquid crystal display device, alignment regulating structures provided on the liquid crystal layer side of at least one of a pair of substrates which face each other with a vertical alignment type liquid crystal layer interposed therebetween. The alignment regulating structure is, for example, a linear slit (opening) or a rib (projecting structure) provided on an electrode. Owing to the alignment regulating structures, an alignment regulating force is supplied from one side or both of two sides of the liquid crystal layer, and so a plurality of liquid crystal domains (typically, four liquid crystal domains) having different alignment directions are formed. In this manner, it is attempted to improve the viewing angle characteristics (see, for example, Patent Document 4).

However, in the liquid crystal display device of Patent Document 4, the alignment regulating force is supplied to liquid crystal molecules by the linear slits or the ribs. Therefore, the alignment regulating force acting on the liquid crystal molecules in the pixel areas varies in accordance with the distance from the slit or the rib. As a result, the response speed of the liquid crystal molecules in the pixels varies. For this reason, a VA mode liquid crystal display device in which the alignment regulating force is supplied to the liquid crystal molecules within a plane of the pixel electrodes by forming the pixel electrodes in a specific shape has been studied (see, for example, Patent Document 5).

In the liquid crystal display device of Patent Document 5, the pixel electrodes having a minute linear pattern (striped pattern) are provided. The linear pattern includes a cross-shaped trunk electrode and linear electrodes extending in four different directions from the trunk electrode. Such a structure of the pixel electrode is called the "fishbone structure". Storage capacitance lines are each provided so as to overlap a part of the cross-shaped trunk electrode. With the liquid crystal display device of Patent Document 5, when a voltage is applied to a liquid crystal layer, the liquid crystal molecules are aligned parallel to the longitudinal direction of the striped pattern. As a result, a plurality of liquid crystal domains (typically, four liquid crystal domains) having different alignment directions are formed. In this manner, it is attempted to improve the viewing angle characteristics.

CITATION LIST

Patent Literature

Patent Document 1: Japanese Laid-Open Patent Publication No. 2007-316234

Patent Document 2: Japanese Laid-Open Patent Publication No. 2007-128094

Patent Document 3: Japanese Laid-Open Patent Publication No. 2006-126228

Patent Document 4: Japanese Laid-Open Patent Publication No. 11-242225

Patent Document 5: Japanese Laid-Open Patent Publication No. 2003-149647

SUMMARY OF INVENTION

Technical Problem

Recently, liquid crystal display devices are desired to have a higher luminance. However, a pixel may occasionally include an area providing a low luminance when a voltage is applied to the liquid crystal layer. For example, in a CPA mode liquid crystal display device, the liquid crystal molecules corresponding to the convexed portions or the openings are aligned generally vertically to a main surface of an alignment film even in the presence of a voltage, and the luminance in such an area is lower than that in the other areas. In a liquid crystal display device of the fishbone structure, the liquid crystal molecules in the vicinity of the trunk electrode are not aligned in a prescribed alignment direction even in the presence of a voltage, and the luminance in such an area is lower than that in the other areas.

When a pixel includes an area providing a lower luminance, it is difficult to provide a liquid crystal display devices of a higher luminance. Especially, liquid crystal display devices are recently desired to be improved in precision. As the precision is more improved, the size of each pixel is decreased. In a CPA mode liquid crystal display device, when the size of the convexed portions is decreased in accordance with the decrease in the size of the pixels, the response speed and the alignment stability are lowered. When the size of the pixel electrodes is decreased without changing the size of the convexed portions, the substantial aperture area size in the pixels is decreased. In a liquid crystal display device of the fishbone structure, the width of the trunk electrode cannot be decreased to a level less than the production limit. Therefore, when the size of the pixel electrodes is decreased, the substantial aperture area size in the pixels is decreased.

The present invention made in light of the above-described problems has an object of providing a liquid crystal display device suitable to the improvement of the luminance.

Solution to Problem

A liquid crystal display device according to the present invention includes an active matrix substrate including a plurality of pixel electrodes provided in a matrix of a plurality of rows by a plurality columns; a counter substrate including a counter electrode; a vertical alignment type liquid crystal layer provided between the active matrix substrate and the counter substrate; and a plurality of axis-symmetrical liquid crystal domain formation portions each for forming a liquid crystal domain in which liquid crystal molecules in the liquid crystal layer are aligned in axis symmetry, the plurality of axis-symmetrical liquid crystal domain formation portions each being located at a center of the respective liquid crystal domain. The plurality of pixel electrodes each define a pixel area; and at least one axis-symmetrical liquid crystal domain formation portion among the plurality of axis-symmetrical liquid crystal domain formation portions is provided in correspondence with an area between two pixel areas defined by two pixel electrodes adjacent to each other among the plurality of pixel electrodes or in correspondence with an area surrounded by four pixel areas defined by four pixel electrodes arranged in two rows by two columns among the plurality of pixel electrodes.

In one embodiment, the plurality of axis-symmetrical liquid crystal domain formation portions include a plurality of convexed portions provided on a liquid crystal layer side of at least one of the active matrix substrate and the counter substrate, or a plurality of electrode-absent portions provided in at least one of the counter electrode and the two or four pixel electrodes among the plurality of pixel electrodes.

In one embodiment, the plurality of convexed portions are provided on the liquid crystal layer side of at least one of the active matrix substrate and the counter substrate.

In one embodiment, the plurality of electrode-absent portions are provided in at least one of the counter electrode and the plurality of pixel electrodes.

In one embodiment, at least one axis-symmetrical liquid crystal domain formation portion among the plurality of axis-symmetrical liquid crystal domain formation portions is provided in correspondence with an area between two pixel areas defined by two pixel electrodes adjacent to each other among the plurality of pixel electrodes.

In one embodiment, the two pixel areas are adjacent to each other in the column direction.

In one embodiment, at least one axis-symmetrical liquid crystal domain formation portion among the plurality of axis-symmetrical liquid crystal domain formation portions is provided in correspondence with an area surrounded by four pixel areas defined by four pixel electrodes arranged in two rows by two columns among the plurality of pixel electrodes.

In one embodiment, the plurality of pixel electrodes include first, second and third pixel electrodes sequentially arranged in a prescribed direction; and the plurality of axis-symmetrical liquid crystal domain formation portions include a first axis-symmetrical liquid crystal domain formation portion provided in correspondence with an area between two pixel areas defined by the first pixel electrode and the second pixel electrode, and a second axis-symmetrical liquid crystal domain formation portion provided in correspondence with an area between two pixel areas defined by the second pixel electrode and the third pixel electrode.

In one embodiment, the plurality of pixel electrodes include first, second, third, fourth, fifth and sixth pixel electrodes arranged in three rows by two columns; and the plurality of axis-symmetrical liquid crystal domain formation portions include a first axis-symmetrical liquid crystal domain formation portion provided in correspondence with an area surrounded by four pixel areas defined by the first, second, third and fourth pixel electrodes, and a second axis-symmetrical liquid crystal domain formation portion provided in correspondence with an area surrounded by four pixel areas defined by the third, fourth, fifth and sixth pixel electrodes.

In one embodiment, the at least one axis-symmetrical liquid crystal domain formation portion overlaps each of the two pixel electrodes or each of the four pixel electrodes by 9 µm or more.

In one embodiment, the pixel areas respectively defined by the plurality of pixel electrodes each include a transmissive region and a reflective region; in the two pixel areas or the four pixel areas, one type of regions among the transmissive regions and the reflective regions are provided so as to face each other; and the at least one axis-symmetrical liquid crystal domain formation portion is provided in correspondence with an area between the two pixel areas or an area surrounded by the four pixel areas.

A liquid crystal display device according to the present invention includes an active matrix substrate including a plurality of pixel electrodes provided in a matrix of a plurality of rows by a plurality columns; a counter substrate including a counter electrode; and a vertical alignment type liquid crystal layer provided between the active matrix substrate and the counter substrate. The plurality of pixel electrodes include a first pixel electrode and a second pixel electrode adjacent to the first pixel electrode; the first pixel electrode includes a first trunk electrode and a plurality of first linear electrodes extending parallel to each other in a first direction from the first trunk electrode, and a plurality of second linear electrodes extending parallel to each other in a second direction, crossing perpendicularly the first direction, from the first trunk electrode; the second pixel electrode includes a second trunk electrode and a plurality of third linear electrodes extending parallel to each other in a third direction, antiparallel to the second direction, from the second trunk electrode, and a plurality of fourth linear electrodes extending parallel to each other in a fourth direction, antiparallel to the first direction, from the second trunk electrode; and the liquid crystal layer includes a first liquid crystal domain formed by the first linear electrodes of the first pixel electrode, a second liquid crystal domain formed by the second linear electrodes of the first pixel electrode, a third liquid crystal domain formed by the third linear electrodes of the second pixel electrode, and a fourth liquid crystal domain formed by the fourth linear electrodes of the second pixel electrode.

In one embodiment, the first pixel electrode and the second pixel electrode are adjacent to each other in the column direction.

A liquid crystal display device according to the present invention includes an active matrix substrate including a plurality of pixel electrodes provided in a matrix of a plurality of rows by a plurality columns; a counter substrate including a counter electrode; and a vertical alignment type liquid crystal layer provided between the active matrix substrate and the counter substrate. The plurality of pixel electrodes include a first pixel electrode, a second pixel electrode, a third pixel electrode and a fourth pixel electrode arranged in two rows by two columns; the first pixel electrode includes a plurality of first linear electrodes extending parallel to each other in a first direction; the second pixel electrode includes a plurality of second linear electrodes extending parallel to each other in a second direction crossing perpendicularly the first direction; the third pixel electrode includes a plurality of third linear electrodes extending parallel to each other in a third direction antiparallel to the second direction; the fourth pixel electrode includes a plurality of fourth linear electrodes extending parallel to each other in a fourth direction antiparallel to the first direction; and the liquid crystal layer includes a first liquid crystal domain formed by the first pixel electrode, a second liquid crystal domain formed by the second pixel electrode, a third liquid crystal domain formed by the third pixel electrode, and a fourth liquid crystal domain formed by the fourth pixel electrode.

In one embodiment, the active matrix substrate further includes gate lines extending parallel to the plurality of rows.

In one embodiment, the gate lines are each provided between the pixel electrodes of two rows adjacent to each other among the plurality of rows.

In one embodiment, the active matrix substrate further includes storage capacitance lines extending parallel to the plurality of rows.

In one embodiment, one type of lines among the gate lines and the storage capacitance lines are each provided between the pixel electrodes of two rows adjacent to each other among the plurality of rows.

In one embodiment, the other type of lines among the gate lines and the storage capacitance lines each overlap the pixel electrodes of one of the two rows.

In one embodiment, the other type of lines each overlap centers of the pixel electrodes of the one of the two rows.

In one embodiment, the other type of lines each overlap portions, other than the centers, of the pixel electrodes of the one of the two rows.

Advantageous Effects of Invention

The present invention can provide a liquid crystal display device suitable to the improvement of the luminance.

BRIEF DESCRIPTION OF DRAWINGS

FIG. 1 FIG. 1(a) is a schematic view of a liquid crystal display device in Embodiment 1 according to the present invention, and FIG. 1(b) is a schematic plan view thereof.

FIG. 3 FIG. 3(a) is a schematic view of a liquid crystal display device in Comparative Example 1, and FIG. 3(b) is a schematic plan view thereof.

FIG. 5 FIG. 5(a) is a schematic view of a liquid crystal display device in Embodiment 2 according to the present invention, and FIG. 5(b) is a schematic plan view thereof.

FIG. 14 FIG. 14(a) is a schematic view of a liquid crystal display device in Embodiment 4 according to the present invention, and FIG. 14(b) is a schematic plan view thereof.

FIG. 15 FIG. 15(a) is a schematic view of a liquid crystal display device in Comparative Example 2, and FIG. 15(b) is a schematic plan view thereof.

DESCRIPTION OF EMBODIMENTS

Figure 2:
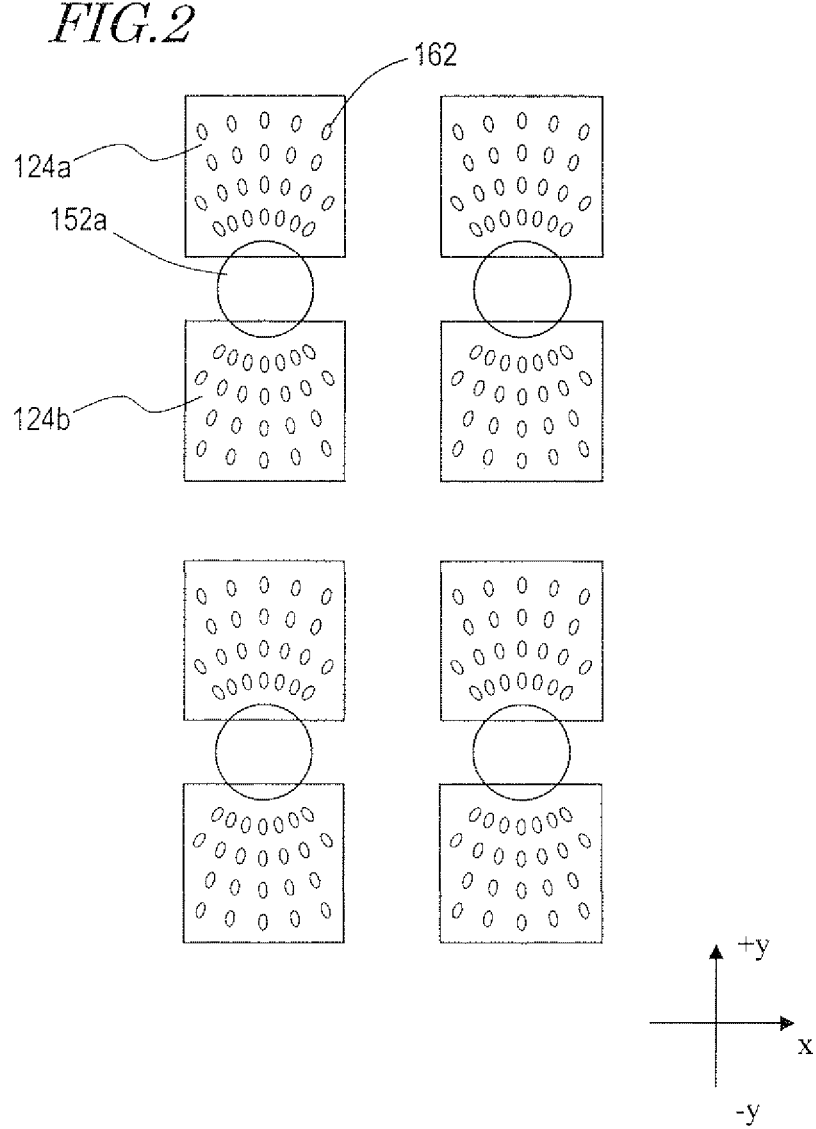
FIG. 2 is a schematic view of one convexed portion and the vicinity thereof in the liquid crystal display device shown in FIG. 1.

Hereinafter, liquid crystal display devices in embodiments according to the present invention will be described with reference to the drawings. The present invention is not limited to the following embodiments.

(Embodiment 1)

Hereinafter, a liquid crystal display device in Embodiment 1 according to the present invention will be described with reference to FIG. 1. FIG. 1(a) is a schematic view of a liquid crystal display device 100A in this embodiment, and FIG. 1(b) is a plan view of the liquid crystal display device 100A.

The liquid crystal display device 100A includes an active matrix substrate 120 including pixel electrodes 124 provided on an insulating plate 122, a counter substrate 140 including a counter electrode 144 provided on an insulating plate 142, and a liquid crystal layer 160 provided between the active matrix substrate 120 and the counter substrate 140. The liquid crystal display device 100A is of a CPA mode.

The active matrix substrate 120 and the counter substrate 140 each have an alignment film and a polarizer plate, neither of which is shown. The polarization axes of the polarizer plates have a crossed Nicols relationship. The liquid crystal display device 100A is, for example, of a transmissive type and may further include a backlight (not shown).

The liquid crystal display device 100A includes a plurality of pixels arranged in a matrix of a plurality of rows by a plurality of columns. For example, in a liquid crystal display device which provides color display using primary colors of R (red), G (green) and B (blue), one color is represented by three pixels of R, G and B. The pixel electrodes 124 each define a pixel area.

The liquid crystal display device 100A operates in a VA mode. The alignment films (not shown) are vertical alignment films, and the liquid crystal layer 160 is a vertical alignment type liquid crystal layer. Liquid crystal molecules 162 have a negative anisotropy, and display in a normally black mode is provided by the liquid crystal molecules 162 in combination with the polarizer plates located in the crossed Nicols relationship. The liquid crystal layer 160 may contain a chiral agent.

Herein, the active matrix substrate 120 and the counter substrate 140 each have the alignment film. Alternatively, at least one of the active matrix substrate 120 and the counter substrate 140 may have the alignment film. It is preferable, however, that both of the active matrix substrate 120 and the counter substrate 140 each have the alignment film from the viewpoint of the alignment stability. The counter substrate 140 includes a color filter and a black matrix.

The liquid crystal display device 100A further includes an axis-symmetrical liquid crystal domain formation portion 150 for forming a liquid crystal domain in which the liquid crystal molecules 162 in the liquid crystal layer 160 are aligned in axis symmetry (C∞), and is positioned at the center of the liquid crystal domain. In the liquid crystal display device 100A, convexed portions 152 are provided as the axis-symmetrical liquid crystal domain formation portions 150 on the liquid crystal layer 160 side of the counter substrate 140. The convexed portions 152 are also called "rivets".

When no voltage is applied to the liquid crystal layer 160 or when the voltage applied thereto is relatively low, the liquid crystal molecules 162 are aligned vertically to a main surface of the alignment film (not shown) except for a part of the liquid crystal molecules 162 which are located in the vicinity of the convexed portions 152. By contrast, when a prescribed voltage is applied to the liquid crystal layer 160, the liquid crystal molecules 162 are tilt-aligned in axis symmetry around each convexed portion 152 as the center. Thus, the axis-symmetrical liquid crystal domains are formed.

FIG. 1(b) schematically show the pixels in the liquid crystal display device 100A. FIG. 1(b) shows the pixels arranged in four rows by four columns. For example, each pixel 124 has a length of 30 μm in an x direction and a length of 90 μm in a y direction.

The active matrix substrate 120 of the liquid crystal display device 100A includes gate lines G extending in the x direction and source lines S extending in the y direction. In the vicinity of intersections of the gate lines G and the source lines S, TFTs (not shown) are provided. The gate lines G each extend between the pixel electrodes 124 of two rows adjacent to each other, and the source lines S each extend between the pixel electrodes 124 of two columns adjacent to each other. For example, the gate lines G and the source lines S each have a width of 4 μm. When necessary, storage capacitance lines (not shown in FIG. 1(b)) may be provided. The black matrix (not shown) may be provided so as to overlap the gate lines G, the source lines S and the storage capacitance lines. In the liquid crystal display device 100A, the convexed portions 152 are provided so as to overlap every other gate lines G.

Now, attention will be paid to two pixel electrodes adjacent to each other in the column direction. Among the two pixel electrodes, one is represented by reference sign 124a and the other is represented by reference sign 124b. Among the convexed portions 152, the convexed portion provided in correspondence with an area between two pixel areas defined by the two pixel electrodes 124a and 124b is represented by reference sign 152a.

In the liquid crystal display device 100A, the convexed portion 152a is provided in correspondence with the area between the pixel areas defined by the two pixel electrodes 124a and 124b, and the convexed portion 152a partially overlaps each of the pixel electrodes 124a and 124b. For example, the convexed portion 152a is a projection having a circular bottom surface of a diameter of 15 μm, and the distance between the pixel electrode 124a and the pixel electrode 124b is 5 μm. In this case, an overlapping width (maximum width) of the convexed portion 152a and the pixel electrode 124a is 5 μm; and similarly, an overlapping width (maximum width) of the convexed portion 152a and the pixel electrode 124b is 5 μm. The bottom surface of the convexed portion 152a may be elliptical.

FIG. 2 shows an enlarged view of pixels in the liquid crystal display device 100A. FIG. 2 shows the pixels arranged in four rows by two columns. As described above, in the liquid crystal display device 100A, the convexed portion 152a is provided in correspondence with the area between the two pixel electrodes 124a and 124b. When a prescribed voltage is applied, the liquid crystal molecules 162 in the two pixel areas corresponding to the pixel electrodes 124a and 124b are tilt-aligned in axis symmetry around the convexed portion 152a as the center. Specifically, when a prescribed voltage is applied, the liquid crystal molecules 162 corresponding to the pixel electrode 124a are aligned in correspondence with a +y side part of the convexed portion 152a, and the liquid crystal molecules 162 corresponding to the pixel electrode 124b are aligned in correspondence with a −y side part of the convexed portion 152a. In this manner, when a voltage is applied, a liquid crystal domain is formed around the convexed portion 152a as the center. In this specification, the center of the symmetrical alignment of the liquid crystal molecules 162 will be referred to as the "alignment center". In the liquid crystal display device 100A, the convexed portions 152 are alignment centers of the liquid crystal molecules 162. In this manner, the liquid crystal molecules 162 corresponding to the two pixel electrodes 124a and 124b are aligned around the convexed portion 152a as the center, and owing to this, the viewing angle characteristics are improved. As described later, it is preferable that the convexed portion 152a is provided so as to overlap each of the pixel electrodes 124a and 124b by 9 μm or more.

Hereinafter, advantages of the liquid crystal display device 100A in this embodiment will be described in comparison with a liquid crystal display device in Comparative Example 1. First, with reference to FIG. 3, a liquid crystal display device 800 in Comparative Example 1 will be described. FIG. 3(a) is a schematic view of the liquid crystal display device 800, and FIG. 3(b) is a plan view of the liquid crystal display device 800.

A counter substrate 840 of the liquid crystal display device 800 includes convexed portions 852 each located in correspondence with the center of a pixel area defined by each pixel electrode 824. When a voltage is applied to a liquid crystal layer 860, liquid crystal molecules 862 are tilt-aligned in axis symmetry around the convexed portions 852 as the centers.

In such a liquid crystal display device 800, when a voltage is applied to the liquid crystal layer 860, the liquid crystal molecules 862 corresponding to the convexed portions 852 are aligned generally vertically to a main surface of an alignment film. Therefore, the luminance of the areas corresponding to the convexed portions 852 is lower than the luminance of the other areas. For example, in the case where the convexed portions 852 have a diameter φ of 15 μm, when the luminance of the entire areas corresponding to the convexed portions 852 is the minimum level, the size of the area where optical loss is caused by the convexed portion 852 in one pixel is 177 μm². The substantial numerical aperture of the pixel corresponds to a value obtained by subtracting the size of this area from the area size of the pixel electrode 824. When the size of the pixel electrodes 824 is decreased, the influence as described above is more conspicuous. When the size of the convexed portions 852 is decreased in accordance with the decrease in the size of the pixel electrodes 824, the response speed and the alignment stability are lowered. When the size of the pixel electrodes 824 is decreased without changing the size of the convexed portions 852, the area size of the openings in the pixels is decreased and also the ratio of the convexed portions 852 of the lower luminance is increased. As a result, the luminance is significantly lowered.

By contrast, in the liquid crystal display device 100A in this embodiment, the convexed portions 152 are each provided in correspondence with the area between the pixel areas defined by the pixel electrodes 124a and 124b. Each convexed portion 152 only partially overlaps the pixel electrodes 124a and 124b, but the remaining part of the convexed portion 152 does not overlap the pixel electrodes 124a or 124b. Therefore, under the conditions that the convexed portions 152 each have a diameter φ of 15 μm, gate lines G each have a width of 4 μm, and the distance between the pixel electrodes 124a and 124b is 4 μm; a sum of the overlapping area size of the convexed portion 152a and the pixel electrode 124a and the overlapping area size of the convexed portion 152a and the pixel electrode 124b is 117 μm². As can be seen from this, the liquid crystal display device 100A in this embodiment can suppress the decrease in the substantial numerical aperture and thus can realize a high luminance.

In the liquid crystal display device 800 in Comparative Example 1, symmetrical viewing angle characteristics are realized in each pixel. By contrast, in the liquid crystal display device 100A, symmetrical viewing angle characteristics are realized in every other pixels. Therefore, with the liquid crystal display device 100A, when, for example, special display of lighting up only the pixels of the odd-numbered rows and not lighting up the pixels of the even-numbered rows is provided, the viewing angle characteristics may not be sufficiently improved occasionally. However, when a general image is displayed, the display quality of the liquid crystal display device 100A is not lowered.

In the above description, the convexed portions 152 are each provided in correspondence with the area between the pixel areas defined by the two pixel electrodes adjacent to each other in the column direction, but the present invention is not limited to this. The convexed portions 152 may be each provided in correspondence with an area between pixel areas defined by two pixel electrodes adjacent to each other in the row direction.

In the above description, the convexed portions 152 are each provided in correspondence with the area between the pixel areas defined by the two pixel electrodes 124, but the present invention is not limited to this. The convexed portions 152 may be each provided in correspondence with an area surrounded by pixel areas defined by four pixel electrodes.

Hereinafter, with reference to FIG. 4, a liquid crystal display device 100A1 will be described. In the liquid crystal display device 100A1, the convexed portions 152 are each provided in correspondence with the center of an area surrounded by pixel areas defined by four pixel electrodes 124. Each convexed portion 152 partially overlaps each of the four pixel electrodes 124. When a voltage is applied to the liquid crystal layer 160, the liquid crystal molecules 162 are aligned in axis symmetry around the convexed portions 152 as the centers. As can be seen, the convexed portions 152 are alignment centers of the liquid crystal molecules 162.

Figure 4:
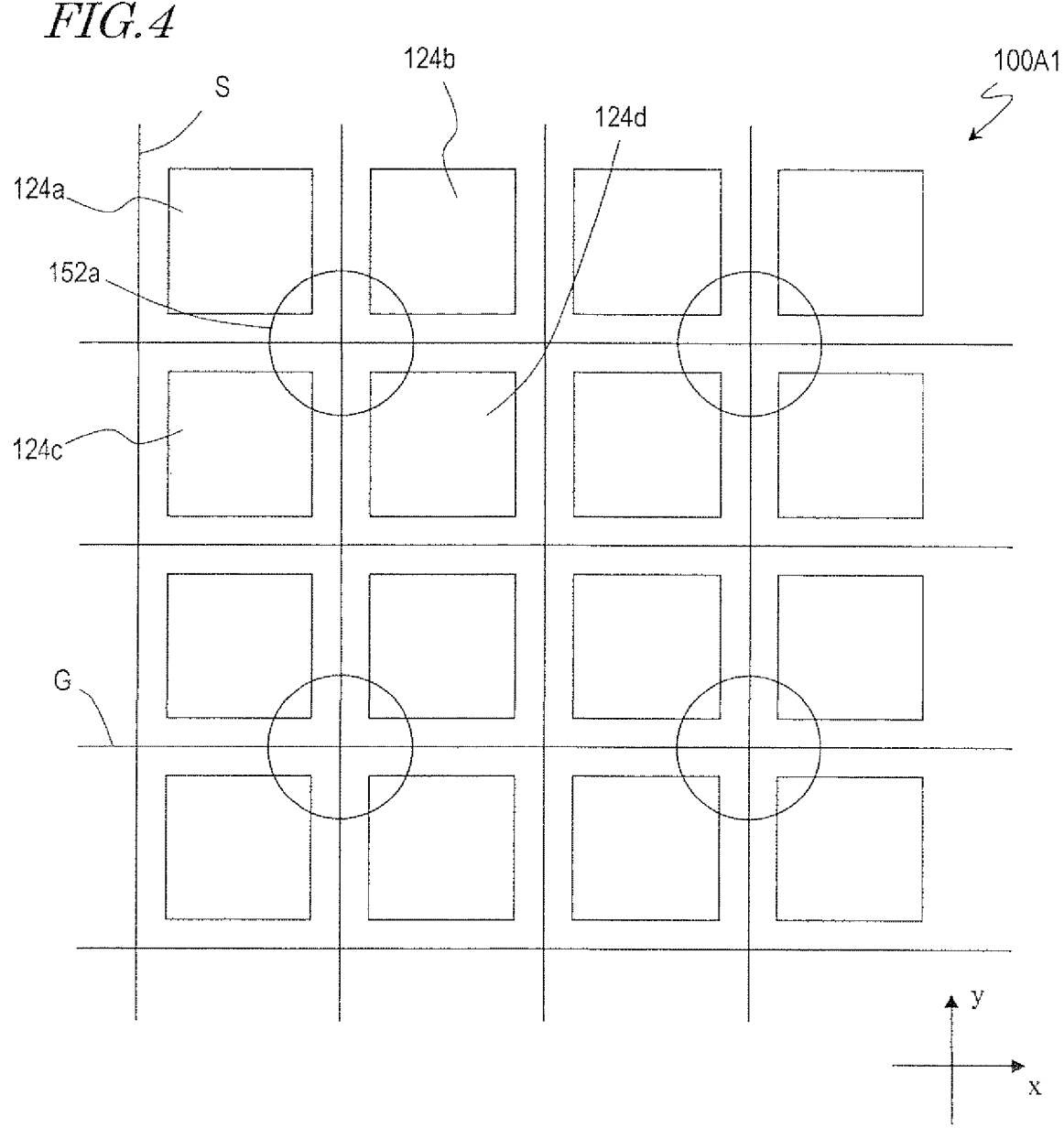
FIG. 4 is a schematic plan view of a liquid crystal display device in a modified example of Embodiment 1.

In FIG. 4, the four pixel electrodes 124 arranged in two rows by two columns are represented by reference signs 124a through 124d. In FIG. 4, among the convexed portions 152, the convexed portion provided at the center of an area surrounded by the pixel electrodes 124a through 124d is represented by reference sign 152a. The convexed portion 152a is provided in correspondence with the center of the area surrounded by the four pixel areas defined by the four pixel electrodes 124a, 124b, 124c and 124d. Paying attention to the convexed portion 152a, the convexed portion 152a is provided in correspondence with one corner of each of the pixel electrodes 124a through 124d. When a voltage is applied to the liquid crystal layer 160, the liquid crystal molecules 162 are aligned in axis symmetry around the convexed portion 152a as the center. Therefore, in an area of the liquid crystal molecules 162 corresponding to the pixel electrodes 124a through 124d, axis-symmetrical alignment centering around the convexed portion 152a is caused. Here again, it is preferable that the convexed portion 152a is provided so as to overlap each of the pixel electrodes 124a, 124b, 124c and 124d by 9 μm or more.

In the above description, the liquid crystal display device is of a transmissive type, but the present invention is not limited to this. The liquid crystal display device may be of a reflective type. For example, the pixel electrodes 124 may have a reflection function, or a reflective member (not shown) may be provided between the pixel electrodes 124 and the insulating plate 122.

In the above description, the convexed portions 152 are provided on the liquid crystal layer 160 side of the counter substrate 140, but the present invention is not limited to this. The convexed portions 152 may be provided on the liquid crystal layer 160 side of the active matrix substrate 120.

(Embodiment 2)

In the above description, as the axis-symmetrical liquid crystal domain formation portions 150, the convexed portions 152 are provided, but the present invention is not limited to this. Electrode-absent portions may be provided as the axis-symmetrical liquid crystal domain formation portions 150.

Hereinafter, a liquid crystal display device in Embodiment 2 according to the present invention will be described. FIG. 5(a) is a schematic view of a liquid crystal display device 100B in this embodiment, and FIG. 5(b) is a schematic plan view of the liquid crystal display device 100B. The liquid crystal display device 100E has substantially the same structure as that of the liquid crystal display device 100A except that the liquid crystal display device 100B includes electrode-absent portions 154 instead of the convexed portions 152. Hence, in order to avoid redundancy, the same descriptions will be omitted.

In the liquid crystal display device 100B, the counter electrode 144 includes the electrode-absent portions 154. The electrode-absent portions 154 are also called "openings". With the liquid crystal display device 100B, in the absence of a voltage, the liquid crystal molecules 162 in the liquid crystal layer 160 are aligned generally vertically to the main surface of the alignment film (not shown). When a voltage is applied to the liquid crystal layer 160, an oblique electric field is generated in correspondence with the electrode-absent portions 154, and the liquid crystal molecules 162 are aligned in axis symmetry around the electrode-absent portions 154 as the centers. In this manner, in the liquid crystal display device 100B, the electrode-absent portions 154 are provided as the axis-symmetrical liquid crystal domain formation portions 150.

FIG. 5(b) schematically shows pixels in the liquid crystal display device 100B. The electrode-absent portions 154 are each provided in correspondence with an area between pixel areas defined by two pixel electrodes 124 adjacent to each other in the column direction, and each electrode-absent portion 154 partially overlaps each of the two pixel electrodes 124. When a voltage is applied to the liquid crystal layer 160, the liquid crystal molecules 162 are tilt-aligned in axis symmetry around the electrode-absent portions 154 as the centers. As can be seen, the electrode-absent portions 154 are alignment centers of the liquid crystal molecules 162.

In FIG. 5(b), among the two pixel electrodes 124 adjacent to each other in the column direction, one is represented reference sign 124a and the other is represented by reference sign 124b. In FIG. 5(b), among the electrode-absent portions 154, the electrode-absent portion provided in the area between the pixel areas defined by the pixel electrodes 124a and 124b is represented by reference sign 154a. The distance between the pixel electrodes 124a and 124b is 5 µm.

In the liquid crystal display device 100B, the electrode-absent portion 154a is provided in correspondence with the area between the pixel areas defined by the pixel electrodes 124a and 124b, and the electrode-absent portion 154a partially overlaps each of the pixel electrodes 124a and 124b. Herein, the electrode-absent portion 154a is elliptical, but may be circular.

Figure 6:
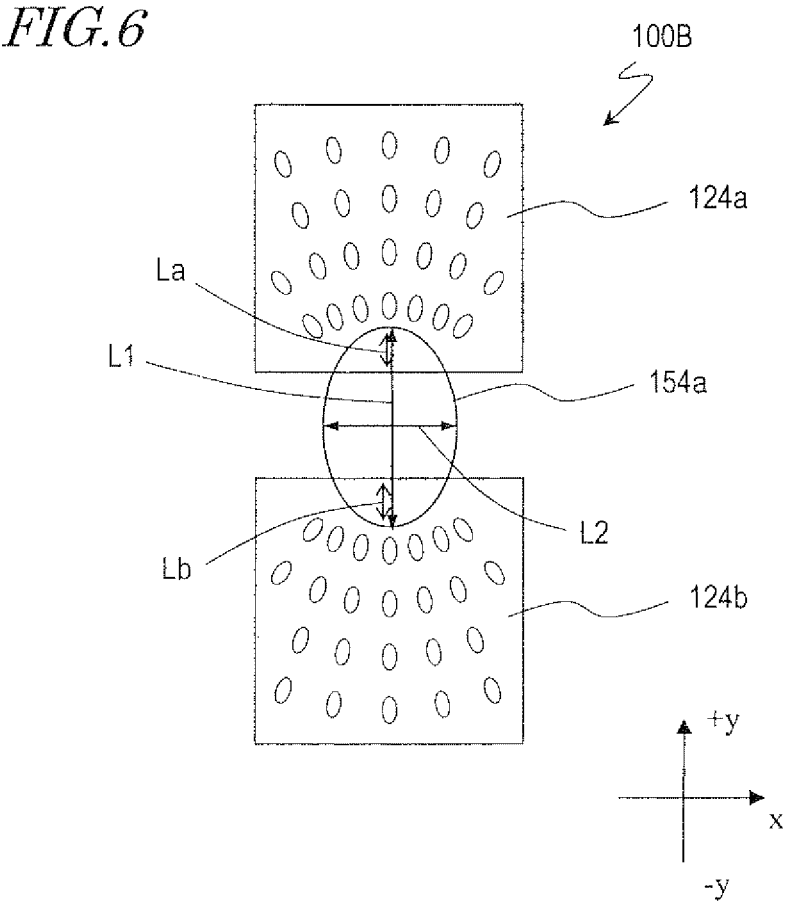
FIG. 6 is an enlarged schematic view of the liquid crystal display device shown in FIG. 5.

Hereinafter, with reference to FIG. 6, the liquid crystal display device 100B will be described. As described above, in the liquid crystal display device 100B, the electrode-absent portion 154a is provided in correspondence with the area between the two pixel electrodes 124a and 124b. When a prescribed voltage is applied, the liquid crystal molecules 162 in the two pixel areas corresponding to the pixel electrodes 124a and 124b are aligned in axis symmetry around the electrode-absent portion 154a as the center. Specifically, when a prescribed voltage is applied, the liquid crystal molecules 162 corresponding to the pixel electrode 124a are aligned in correspondence with a +y side part of the electrode-absent portion 154a, and the liquid crystal molecules 162 corresponding to the pixel electrode 124b are aligned in correspondence with a −y side part of the electrode-absent portion 154a. In the liquid crystal display device 100B, the electrode-absent portion 154a is the alignment center of the liquid crystal molecules 162. In this manner, the liquid crystal molecules 162 corresponding to the two pixel electrodes 124a and 124b are aligned around the electrode-absent portion 154a as the center, and owing to this, the viewing angle characteristics are improved.

The electrode-absent portions 154 are elliptical and each have a longer diameter L1 of 23 µm and a shorter diameter L2 of 14 µm. An overlapping width La of the electrode-absent portion 154a and the pixel electrode 124a is 9 µm, and an overlapping width Lb of the electrode-absent portion 154a and the pixel electrode 124b is 9 µm. As can be seen, the electrode-absent portion 154a overlaps each of the pixel electrodes 124a and 124b by 9 µm or more. Namely, the electrode-absent portion 154a overlaps the two pixel electrodes 124a and 124b by a total of 18 µm or more. In this case, even when the display screen is pressed while white is displayed, no pressing trace is left. By contrast, in the case where the electrode-absent portion is a circle having a diameter of 14 µm, when the display screen is pressed while white is displayed, a pressing trace may be left occasionally. From the above, it is preferable that the electrode-absent portions 154 are each provided so as to overlap each of the pixel electrodes 124a and 124b by 9 µm or more. Also in the liquid crystal display devices 100A and 100A1 described above, it is preferable that the convexed portions 152 are each provided so as to overlap each of the pixel electrodes 124 by 9 µm or more. The electrode-absent portions 154 are not limited to being elliptical or circular, and may have a different shape as long as the liquid crystal molecules 162 can be tilt-aligned in axis symmetry.

In the above description, the electrode-absent portions 154 are each provided in correspondence with the area between the pixel areas defined by the two pixel electrodes 124, but the present invention is not limited to this. The electrode-absent portions 154 may be each provided in correspondence with an area surrounded by pixel areas defined by four pixel electrodes.

In the liquid crystal display device 100B described above, the electrode-absent portions 154 are provided on the liquid crystal layer 160 side of the counter substrate 140, but the present invention is not limited to this. The electrode-absent portions 154 may be provided on the liquid crystal layer 160 side of the active matrix substrate 120. The convexed portions 154 may be formed in the pixel electrodes 124.

(Embodiment 3)

In the above description, one liquid crystal domain is formed in one pixel, but the present invention is not limited to this. A plurality of liquid crystal domains may be formed in one pixel. As understood from the above description, when a voltage is applied to the liquid crystal layer 160, axis-symmetrical liquid crystal domains are formed around the convexed portions 152 or the electrode-absent portions 154 as the centers. Hence, in the following description, the convexed portions 152 and the electrode-absent portions 154 may be collectively referred to as the "axis-symmetrical liquid crystal domain formation portions 150" or the "domain formation portions 150" occasionally.

Figure 7:
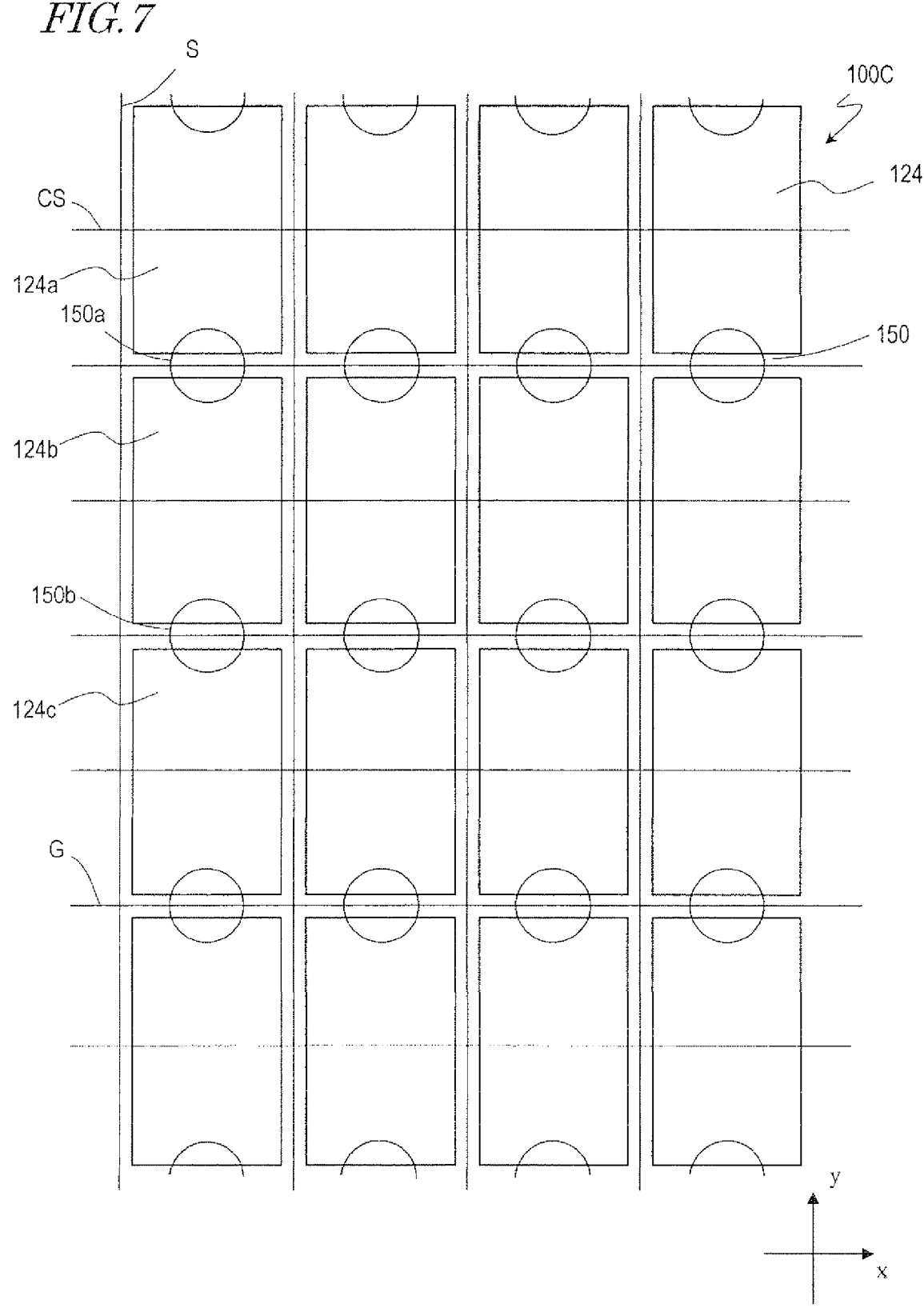
FIG. 7 is a schematic view of a liquid crystal display device in Embodiment 3 according to the present invention.

Hereinafter, with reference to FIG. 7, a liquid crystal display device in Embodiment 3 according to the present invention will be described. FIG. 7 is a schematic view of a liquid crystal display device 100C in this embodiment. The liquid crystal display device 100C has substantially the same structure as that of the liquid crystal display device 100A except that a plurality of liquid crystal domains are formed in one pixel in the liquid crystal display device 100C. Hence, in order to avoid redundancy, the same descriptions will be omitted.

In the liquid crystal display device 100C, the gate lines G are each provided in correspondence with an area between the pixel electrodes 124 of two rows adjacent to each other, and the domain formation portions 150 are provided so as to overlap the gate lines G. Storage capacitance lines CS each overlap the pixel electrodes 124 of one of the two rows adjacent to each other. Herein, the storage capacitance lines CS are each provided so as to overlap the centers of the pixel electrodes 124. For example, the pixel electrodes 124 each have a length of 30 μm in the x direction and a length of 90 μm in the y direction.

In FIG. 7, three pixel electrodes 124 sequentially arranged in the column direction are represented by reference signs 124a, 124b and 124c. In FIG. 7, among the domain formation portions 150, the domain formation portion provided in correspondence with an area between the pixel electrodes 124a and 124b is represented by reference sign 150a, and the domain formation portion provided in correspondence with an area between the pixel electrodes 124b and 124c is represented by reference sign 150b.

Paying attention to the pixel electrode 124b, the domain formation portions 150a and 150b are provided in correspondence with the pixel electrode 124b. The domain formation portion 150a is provided so as to overlap one edge of the pixel electrode 124b, and the domain formation portion 150b is provided so as to overlap the other edge of the pixel electrode 124b.

Figure 8:
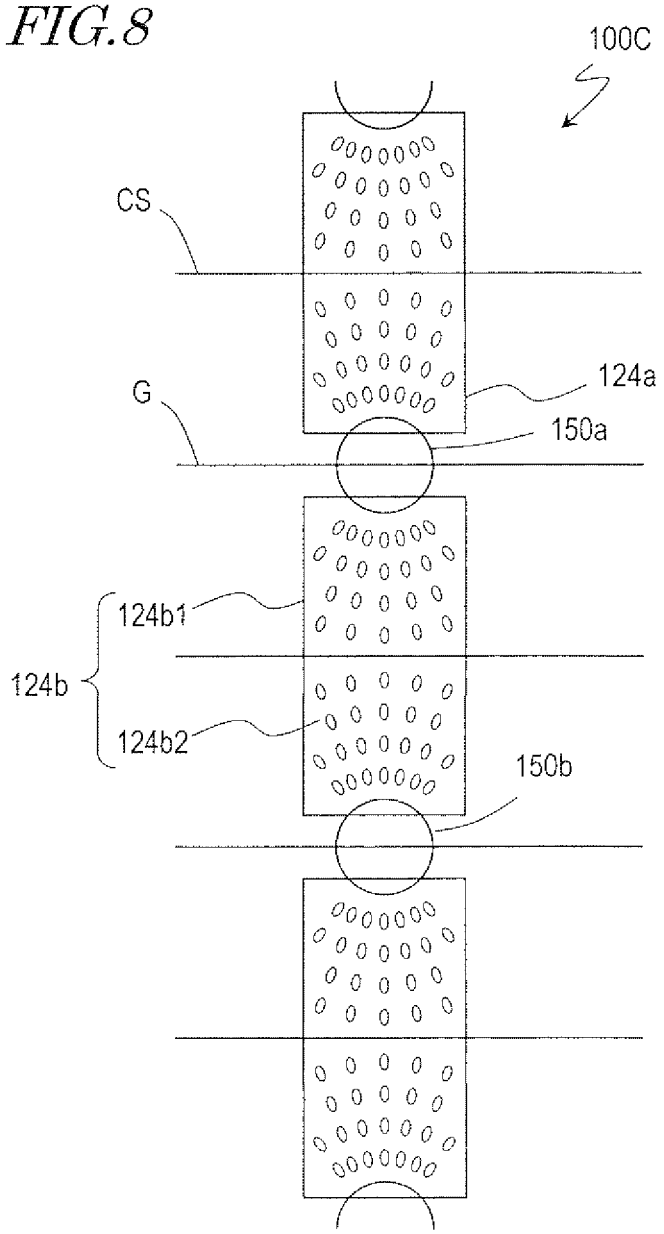
FIG. 8 is a schematic view of convexed portions and the vicinity thereof in the liquid crystal display device shown in FIG. 7.

FIG. 8 is a schematic enlarged view of the liquid crystal display device 100C. In an area corresponding to the pixel electrode 124b, liquid crystal domains centering around the domain formation portions 150a and 150b are formed. Specifically, two areas 124b1 and 124b2 are defined by the pixel electrode 124b. In the area 124b1, the liquid crystal domain centering around the domain formation portion 150a is formed; and in the area 124b2, the liquid crystal domain centering around the domain formation portion 150b is formed. Therefore, when the entirety of the pixel electrode 124b is seen, the liquid crystal molecules 162 corresponding to the pixel electrode 124 are tilt-aligned in almost all the azimuths. Owing to this, the viewing angle characteristics are improved.

In the liquid crystal domain formed in correspondence with the pixel electrode 124b, a disclination line is formed between the domain formation portions 150a and 150b. The disclination line is formed in an area corresponding to a line which equally divides a line segment connecting the domain formation portions 150a and 150b. In the liquid crystal display device 100C, the storage capacitance line CS is provided so as to overlap the disclination line. Therefore, the disclination line does not substantially contribute the decrease in the numerical aperture.

In the above description, the pixel electrodes 124 have a uniform width, but the present invention is not limited to this. The width of the pixel electrodes 124 may be varied.

Figure 9:
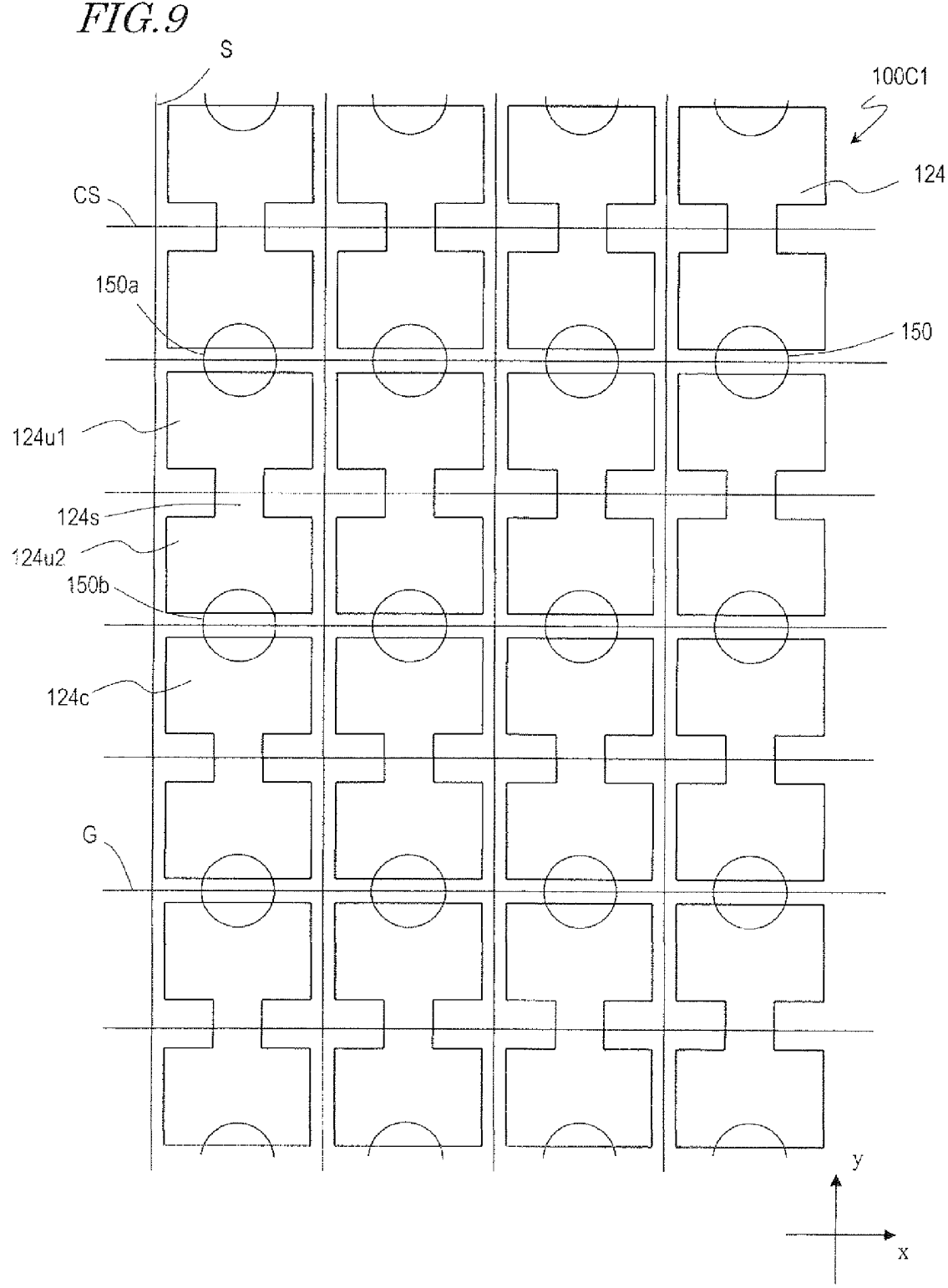
FIG. 9 is a schematic view of a liquid crystal display device in a modified example of Embodiment 3.

As shown in FIG. 9, in a liquid crystal display device 100C1, the pixel electrodes 124 each include a unit electrode 124u1, a unit electrode 124u2 and a connection section 124s for connecting the unit electrode 124u1 and the unit electrode 124u2. The connection section 124s has a length in the x direction which is shorter than that of each of the unit electrode 124u1 and 124u2.

With the liquid crystal display device 100C1, when a voltage is applied to the liquid crystal layer 160, the liquid crystal molecules 162 corresponding to the unit electrode 124u1 are tilt-aligned in axis symmetry around the domain formation portion 150a as the center, and the liquid crystal molecules 162 corresponding to the unit electrode 124u2 are tilt-aligned in axis symmetry around the domain formation portion 150b as the center. As can be seen, since the length of the connection section 124s of the pixel electrode 124 in the x direction is shorter than that of each of the unit electrode 124u1 and 124u2, the liquid crystal molecules 162 corresponding to the unit electrodes 124u1 and 124u2 are aligned in accordance with the oblique electric field. Owing to this, the response speed and the alignment stability can be improved. Especially in the case where the length of the pixel electrode 124 in the y direction is relatively longer than the length thereof in the x direction, the length of each of the unit electrodes 124u1 and 124u2 in the y direction can be made generally equal to the length thereof in the x direction. Therefore, the response speed and the alignment stability can be further improved.

Figure 10:
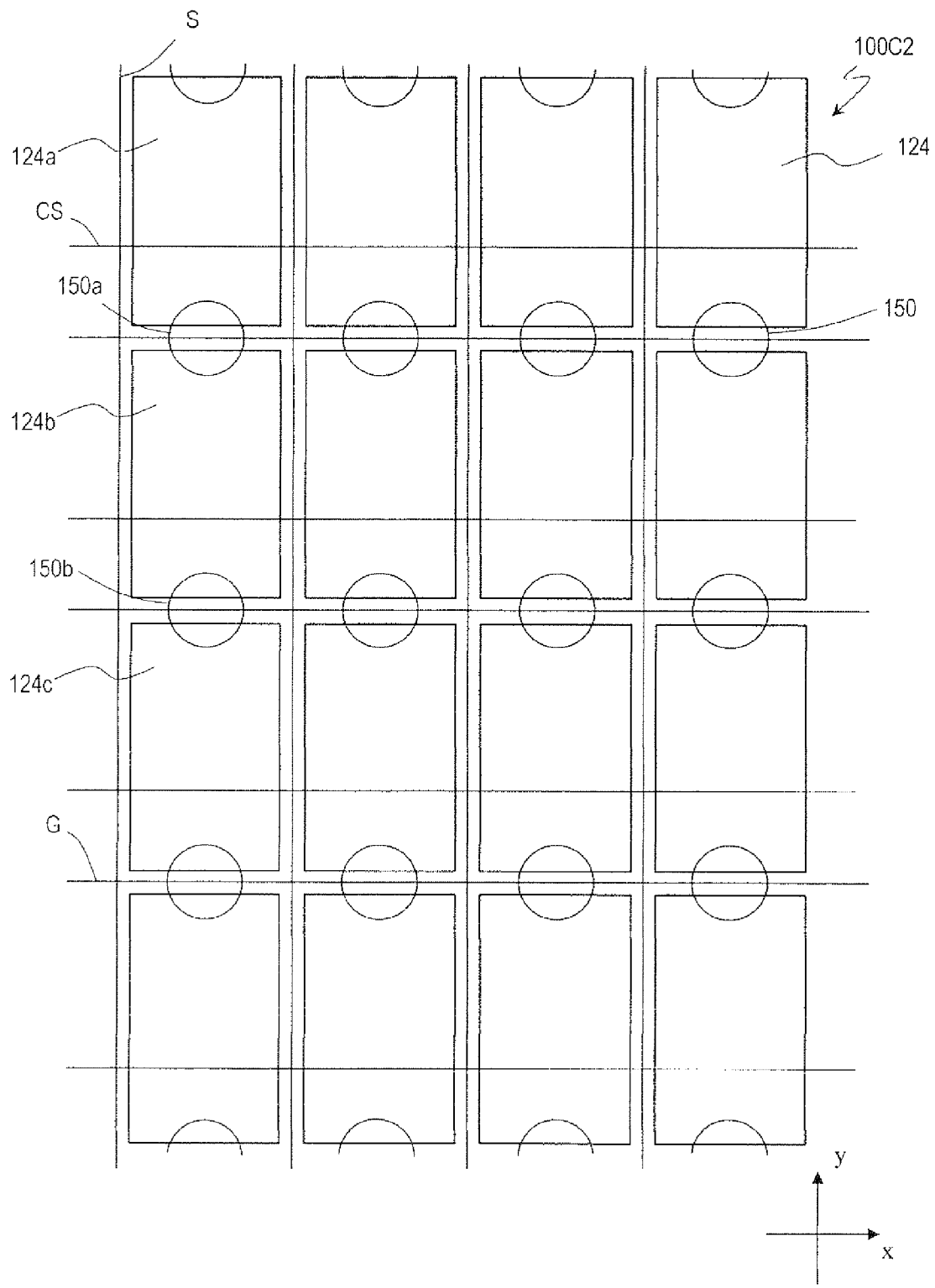
FIG. 10 is a schematic view of a liquid crystal display device in another modified example of Embodiment 3.

In the liquid crystal display devices 100C and 100C1 described above, the storage capacitance lines CS are provided so as to overlap the centers of the pixel electrodes 124, but the present invention is not limited to this. As shown in FIG. 10, in a liquid crystal display device 100C2, the storage capacitance lines CS may be provided so as to overlap portions, other than the centers, of the pixel electrodes 124.

In the above description, the gate lines G are provided so as to overlap the domain formation portions 150 provided between the pixel electrodes 124 of the two rows adjacent to each other and the storage capacitance lines CS are provided so as to overlap the pixel electrodes 124, but the present invention is not limited to this. The storage capacitance lines CS may be provided so as to overlap the domain formation portions 150 located between the pixel electrodes 124 of two rows adjacent to each other and the gate lines G may be provided so as to overlap the pixel electrodes 124.

As described above, one type of lines among the gate lines G and the storage capacitance lines CS may be provided so as to overlap the domain formation portions 150 located between two rows adjacent to each other in the column direction, and the other type of lines among the gate lines G and the storage capacitance lines CS may be provided so as to overlap the pixel electrodes. It is preferable that the other type of lines are provided so as to overlap the borderline between different axis-symmetrical tilt-alignment regions which are provided by the domain formation portions 150a and 150b located in correspondence with two pixel electrodes adjacent to each other in the column direction (for example, the pixel electrodes 124a and 124b).

In the liquid crystal display devices 100C, 100C1 and 100C2 described above, the domain formation portions 150 are each provided in correspondence with the area between the two pixel electrodes 124, but the present invention is not limited to this. The domain formation portions 150 may be each provided in correspondence with an area surrounded by four pixel electrodes 124.

Hereinafter, with reference to FIG. 11, a liquid crystal display device 100C3 will be described. In the liquid crystal display device 100C3, the domain formation portions 150 are each provided in correspondence with the center of an area surrounded by pixel areas defined by four pixel electrodes 124. Each domain formation portion 150 partially overlaps each of the four pixel electrodes 124. When a voltage is applied to the liquid crystal layer 160, the liquid crystal molecules 162 are aligned in axis symmetry around the closest domain formation portions 150 as the centers. As can be seen, the domain formation portions 150 are alignment centers of the liquid crystal molecules 162.

Figure 11:
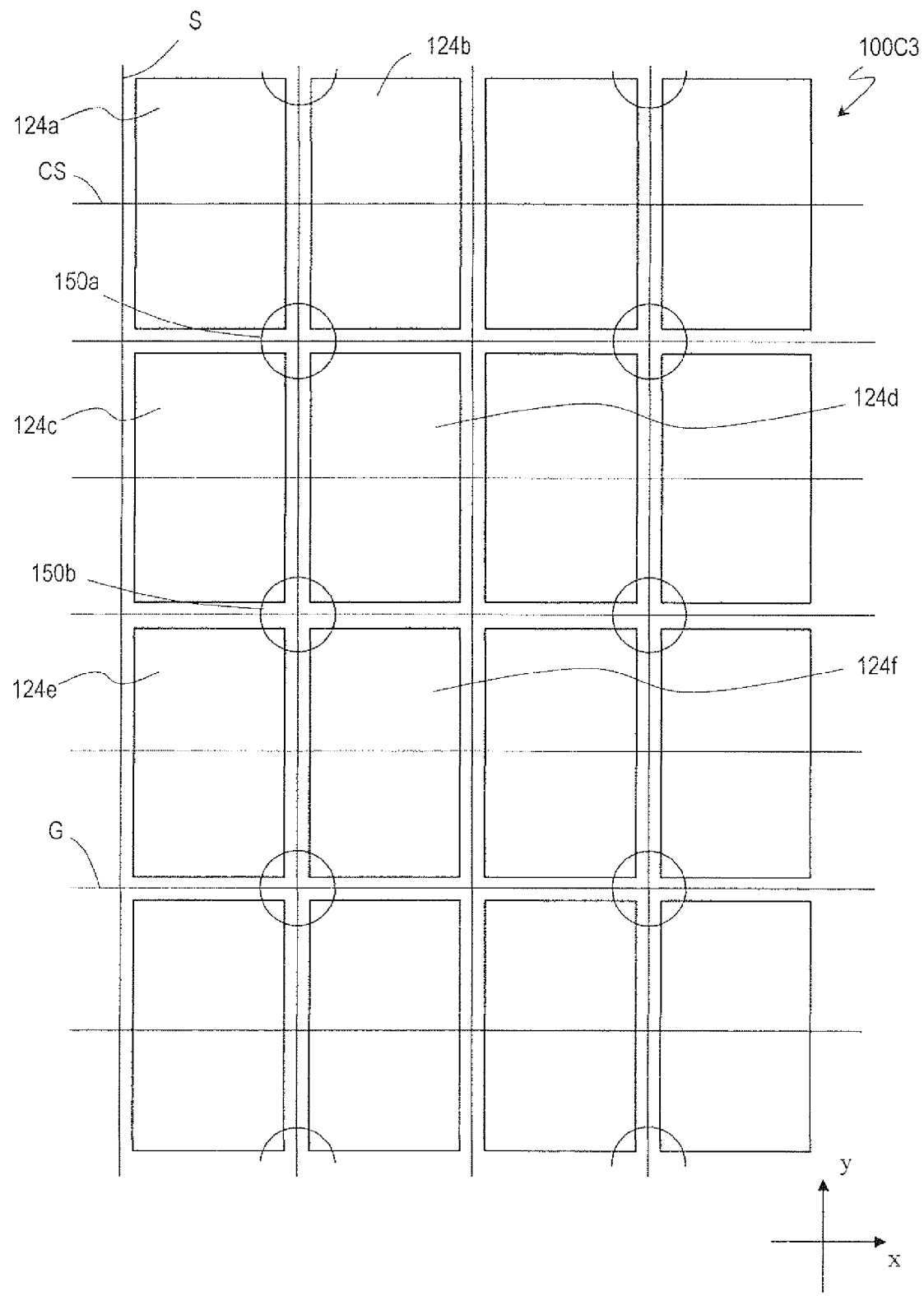
FIG. 11 is a schematic view of a liquid crystal display device in still another modified example of Embodiment 3.

In FIG. 11, among six pixel electrodes 124 arranged in three rows by two columns, the pixel electrodes located at the upper left position, the upper right position, the center left position, the center right position, the lower left position and the lower right position are respectively represented by reference signs 124a through 124f. In FIG. 11, among the domain formation portions 150, the domain formation portion provided in correspondence with the center of an area surrounded by the four pixel electrodes 124a, 124b, 124c and 124d is represented by reference sign 150a, and the domain formation portion provided in correspondence with the center of an area surrounded by the four pixel electrodes 124c, 124d, 124e and 124f is represented by reference sign 150b.

Paying attention to the pixel electrode 124c, the domain formation portions 150a and 150b are respectively provided in correspondence with two corners of the pixel electrode 124c. When a voltage is applied to the liquid crystal layer 160, in an area of the liquid crystal layer 160 which corresponds to the pixel electrode 124c, a part of axis-symmetrical alignment centering around the domain formation portion 150a and a part of axis-symmetrical alignment centering around the domain formation portion 150b are formed. More precisely, a disclination line may be formed occasionally in an area corresponding to a line which equally divides a line segment connecting the domain formation portions 150a and 150b. The storage capacitance lines CS extend in the x direction through the centers of the pixel electrodes 124 so as to overlap the disclination line, and thus efficiently suppress the decrease in the numerical aperture.

In the above description, the liquid crystal display device is of a transmissive type, but the present invention is not limited to this. The liquid crystal display device may be of a reflective type. For example, the pixel electrodes 124 may have a reflection function, or a reflective member (not shown) may be provided between the pixel electrodes 124 and the insulating plate 122. Alternatively, the liquid crystal display device may be of a transreflective type.

Hereinafter, with reference to FIG. 12, the liquid crystal display device 100C4 will be described. The liquid crystal display device 100C4 is of a transreflective type.

In the liquid crystal display device 100C4, pixel areas defined by the pixel electrodes 124 each include a transmissive region 124t and a reflective region 124r. In the liquid crystal display device 100C4, the domain formation portions 150 are each provided in correspondence with an area between pixel areas defined by two pixel electrodes 124 adjacent to each other in the column direction.

Figure 12:
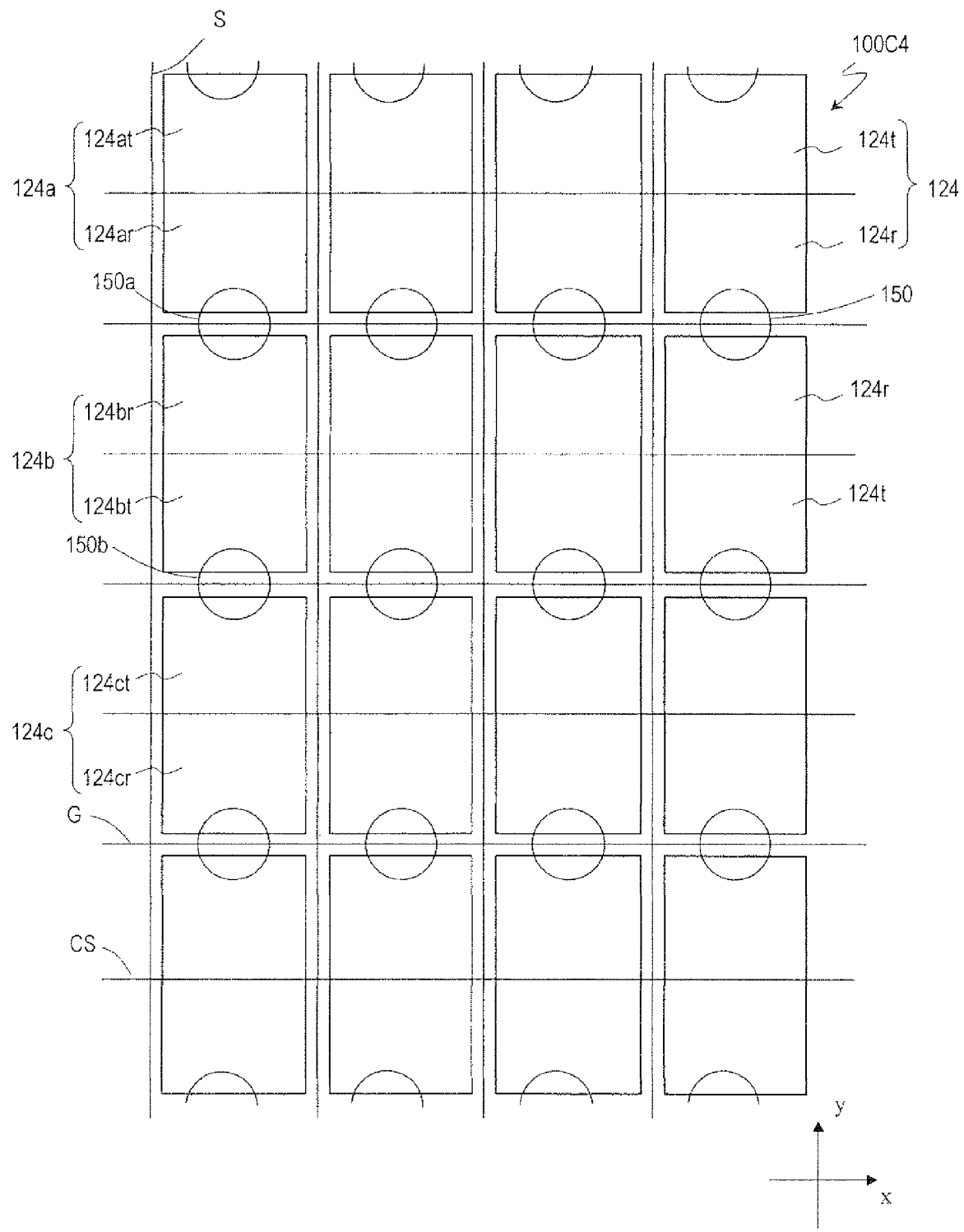
FIG. 12 is a schematic view of a liquid crystal display device in still another modified example of Embodiment 3.

In FIG. 12, three pixel electrodes 124 sequentially arranged in the column direction are represented by reference signs 124a through 124c. The transmissive regions and the reflective regions corresponding to the pixel electrodes 124a through 124c are respectively represented by 124at through 124ct and 124ar through 124cr. Among the domain formation portions 150, the domain formation portion provided in an area between the pixel electrodes 124a and 124b is represented by reference sign 150a, and the domain formation portion provided in an area between the pixel electrodes 124b and 124c is represented by reference sign 150b.

In the liquid crystal display device 100C4, the reflective region 124ar corresponding to the pixel electrode 124a and the reflective region 124br corresponding to the pixel electrode 124b are adjacent to each other. The domain formation portion 150a is provided in an area between the reflective region 124ar and the reflective region 124br, and the domain formation portion 150b is provided in an area between the transmissive region 124bt and the transmissive region 124ct.

When a voltage is applied to the liquid crystal layer 160, the liquid crystal molecules 162 corresponding to the reflective region 124ar and the reflective region 124br are aligned in axis symmetry around the domain formation portion 150a as the center. When a voltage is applied to the liquid crystal layer 160, the liquid crystal molecules 162 corresponding to the transmissive regions 124bt and 124ct are aligned in axis symmetry around the domain formation portion 150b as the center. In this manner, in the liquid crystal display device 100C4, liquid crystal domains, each centering around the domain formation portion 150 provided in correspondence with the area between the transmissive regions 124t of two pixel electrodes 124 or in correspondence with the area between the reflective regions 124r of two pixel electrodes 124, are formed.

In the liquid crystal display device 100C4, the domain formation portions 150 are each provided in correspondence with the area between the two pixel electrodes, but the present invention is not limited to this. The domain formation portions 150 may be each provided in correspondence with an area surrounded by four pixel electrodes.

Hereinafter, with reference to FIG. 13, a liquid crystal display device 100C5 will be described. In the liquid crystal display device 100C5, pixel areas defined by the pixel electrodes 124 each include a transmissive region 124t and a reflective region 124r. In the liquid crystal display device 100C5, the domain formation portions 150 are each provided in correspondence with an area surrounded by pixel areas defined by four pixel electrodes 124 arranged in two rows by two columns.

Figure 13:
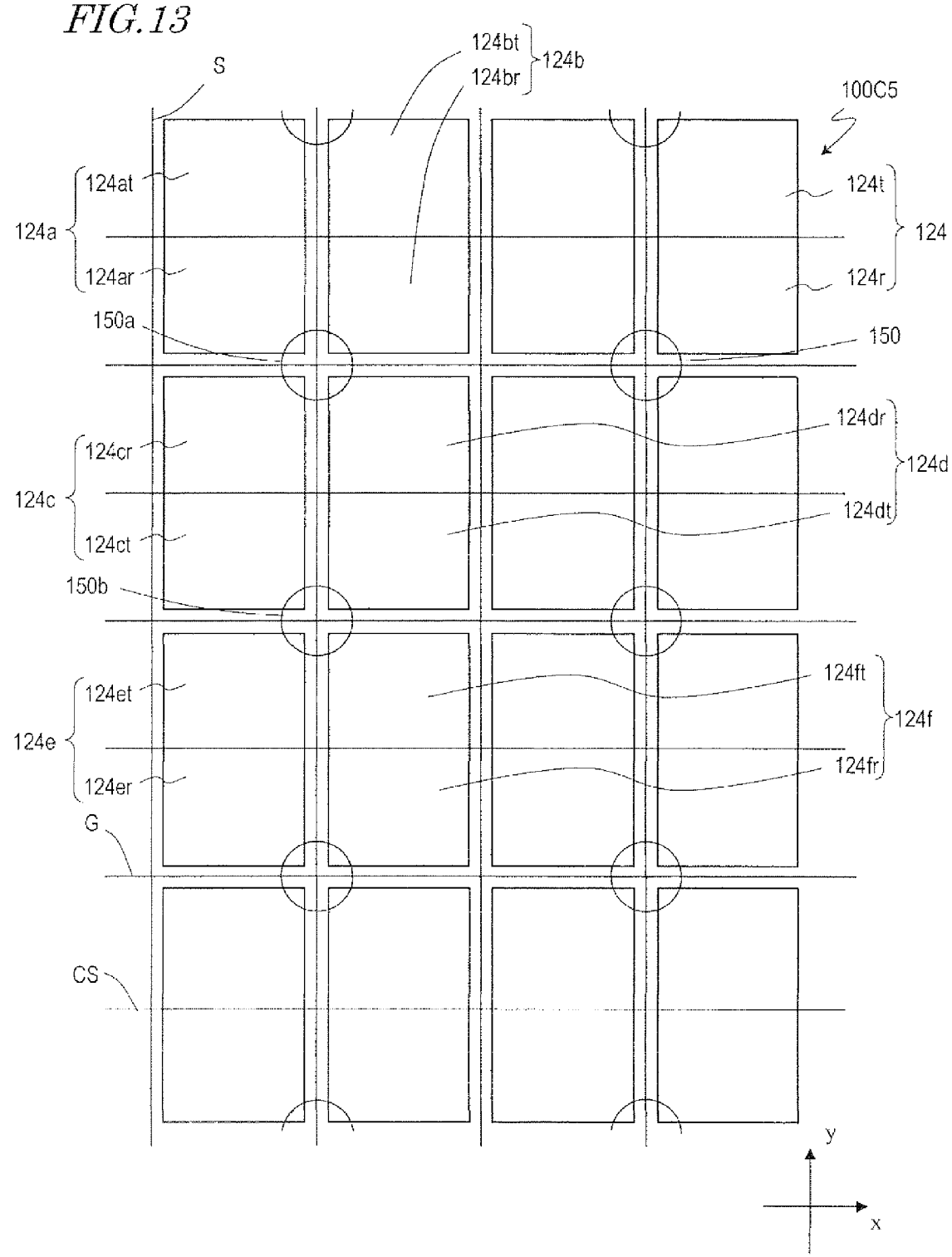
FIG. 13 is a schematic view of a liquid crystal display device in still another modified example of Embodiment 3.

In FIG. 13, among six pixel electrodes 124 arranged in three rows by two columns, the pixel electrodes located at the upper left position, the upper right position, the center left position, the center right position, the lower left position and the lower right position are respectively represented by reference signs 124a through 124f. In FIG. 13, among the domain formation portions 150, the domain formation portion provided in correspondence with an area surrounded by pixel areas defined by the pixel electrodes 124a through 124d is represented by reference sign 150a, and the domain formation portion provided in correspondence with an area surrounded by pixel areas defined by the pixel electrodes 124c through 124f is represented by reference sign 150b. The transmissive regions corresponding to the pixel electrodes 124a through 124f are respectively represented by 124at through 124ft. The reflective regions corresponding to the pixel electrodes 124a through 124f are respectively represented by 124ar through 124fr.

In the liquid crystal display device 100C5, the reflective regions 124ar through 124dr corresponding to the pixel electrodes 124a through 124d face each other, and the domain formation portion 150a is provided so as to overlap a part of each of the reflective regions 124ar through 124dr. Similarly, the transmissive regions 124ct through 124ft corresponding to the pixel electrodes 124c through 124f face each other, and the domain formation portion 150b is provided so as to overlap a part of each of the transmissive regions 124ct through 124ft. When a voltage is applied to the liquid crystal layer 160, the liquid crystal molecules 162 corresponding to the reflective regions 124ar through 124dr are aligned in axis symmetry around the domain formation portion 150a as the center. When a voltage is applied to the liquid crystal layer 160, the liquid crystal molecules 162 corresponding to the transmissive regions 124ct through 124ft are aligned in axis symmetry around the domain formation portion 150b as the center.

In this manner, in the liquid crystal display device 100C5, a liquid crystal domain, centering around the domain formation portion 150a surrounded by the reflective regions 124ar through 124dr corresponding to the pixel electrodes 124a through 124d, is formed. Another liquid crystal domain, centering around the domain formation portion 150b surrounded by the transmissive regions 124ct through 124ft corresponding to the pixel electrodes 124c through 124f, is formed.

(Embodiment 4)

In the above description, the liquid crystal display device is of a CPA mode, but the present invention is not limited to this. The liquid crystal display device may be of another mode.

Hereinafter, a liquid crystal display device in Embodiment 4 according to the present invention will be described. FIG. 14(a) is a schematic view of a liquid crystal display device 100D in this embodiment, and FIG. 14(b) is a schematic plan view of the liquid crystal display device 100D. The liquid crystal display device 100D does not include the axis-symmetrical domain formation portions 150 and has substantially the same structure as that of the liquid crystal display device 100A except for the shape of the pixel electrodes 124. Hence, in order to avoid redundancy, the same descriptions will be omitted.

In the liquid crystal display device 100D, the pixel electrodes 124 each include a trunk electrode 124j and a plurality of linear electrodes 124k extending parallel to each other in each of directions d1 through d4 from the trunk electrode 124j.

The active matrix substrate 120 and the counter substrate 140 each include an alignment film and a polarizer plate, neither of which is shown. The polarization axes of the polarizer plates extend in the x axis direction and the y axis direction, and have a crossed Nicols relationship.

In FIG. 14(b), among two pixel electrodes 124 adjacent to each other in the column direction, one is represented by reference sign 124a and the other is represented by reference sign 124b. The pixel electrode 124b is line-symmetrical to the pixel electrode 124a with respect to the x axis direction and the y axis direction, and is generally point-symmetrical to the pixel electrode 124a.

The pixel electrode 124a includes a trunk electrode 124aj, a plurality of linear electrodes 124k1 extending parallel to each other in the direction d1 from the trunk electrode 124aj, and a plurality of linear electrodes 124k2 extending parallel to each other in the direction d2, crossing perpendicularly the direction d1, from the trunk electrode 124aj. The pixel electrode 124b includes a trunk electrode 124bj, a plurality of linear electrodes 124k3 extending parallel to each other in the direction d3, antiparallel to the direction d2, from the trunk electrode 124bj, and a plurality of linear electrodes 124k4 extending parallel to each other in the direction d4, antiparallel to the direction d1, from the trunk electrode 124bj. Here, it is set that the horizontal direction (left-right direction) of the display screen (the plane of the sheet of FIG. 14(b)) is the reference direction on which the azimuth angle direction is measured, and the counterclockwise direction is the forward direction (considering that the display screen is the face of the clock, the 3 o'clock direction is the azimuth angle of 0° and the counterclockwise direction is the forward direction). With such settings, the directions d1 through d4 are 135°, 45°, 225° and 315°, respectively. The trunk electrodes 124aj and 124bj extend only in the y direction and do not extend in the x direction.

For example, in the pixel electrodes 124a and 124b, the trunk electrodes 124aj and 124bj each have a width of 3 μm. The linear electrodes 124k1, 124k2, 124k3 and 124k4 each have a width of 3 μm, and the distance therebetween is 3 μm.

The trunk electrode 124aj of the pixel electrode 124a is provided on the same straight line as the trunk electrode 124bj of the pixel electrode 124b.

The liquid crystal layer 160 is of a vertical alignment type. The liquid crystal layer 160 includes a liquid crystal domain A formed by the linear electrodes 124k1 of the pixel electrode 124a, a liquid crystal domain B formed by the linear electrodes 124k2 of the pixel electrode 124a, a liquid crystal domain C formed by the linear electrodes 124k3 of the pixel electrode 124b, and a liquid crystal domain D formed by the linear electrodes 124k4 of the pixel electrode 124b. When no voltage is applied to the liquid crystal layer 160 or when the voltage applied thereto is relatively low, the liquid crystal molecules 162 are aligned vertically to a main surface of the alignment film (not shown) except for in the vicinity of the pixel electrodes 124. By contrast, when a prescribed voltage is applied to the liquid crystal layer 160, the liquid crystal molecules 162 are aligned in the directions d1 through d4 in which the linear electrodes 124k1, 124k2, 124k3 and 124k4 extend.

In this specification, the alignment direction of the liquid crystal molecules at the center of each of the liquid crystal domains A through D is referred to as the "reference alignment direction". Among the reference alignment directions, an azimuth angle component of a direction from the rear side to the front side along the longer axis of the liquid crystal molecules (namely, the azimuth angle component of the liquid crystal molecules projected on the main surface of the alignment film) is referred to as the "reference alignment azimuth". The reference alignment azimuth characterizes the corresponding liquid crystal domain and dominantly influences the viewing angle characteristics of the respective liquid crystal domain. Where the horizontal direction (left-right direction) of the display screen (the plane of the sheet of FIG. 14(b)) is the reference direction on which the azimuth angle direction is measured and the counterclockwise direction is the forward direction, the reference alignment azimuths of the four liquid crystal domains A through D are set such that the difference between two random azimuths out of these four azimuths is generally equal to an integral multiple of 90°. Specifically, the reference alignment azimuths of the liquid crystal domains A, B, C and D are 135°, 45°, 225° and 315°, respectively. In this manner, the liquid crystal molecules 162 are aligned in four different directions d1 through d4, and owing to this, the viewing angle characteristics are improved.

Paying attention to a plane including a straight line along the trunk electrodes 124aj and 124bj of the pixel electrodes 124a and 124b, in the presence of a voltage, the liquid crystal molecules 162 are aligned symmetrically with respect to this plane. The liquid crystal molecules 162 are aligned around the center of the area between the pixel areas defined by the pixel electrodes 124a and 124b as the center. In the liquid crystal display device 100D, the center of alignment is at the center of the area between the pixel areas defined by the pixel electrodes 124a and 124b.

Hereinafter, advantages of the liquid crystal display device 100D in this embodiment will be described in comparison with a liquid crystal display device in Comparative Example 2. First, with reference to FIG. 15, a liquid crystal display device 900 in Comparative Example 2 will be described. FIG. 15(a) is a schematic view of the liquid crystal display device 900, and FIG. 15(b) is a plan view of the liquid crystal display device 900. Pixel electrodes 924 of the liquid crystal display device 900 each correspond to a combination of the pixel electrodes 124a and 124b.

In the liquid crystal display device 900, the pixel electrodes 924 each include a cross-shaped trunk electrode 924j and linear electrodes 924k1 through 924k4 extending in each of four different directions d1 through d4 from the trunk electrode 924j. When a voltage is applied to a liquid crystal layer 960 in the liquid crystal display device 900, liquid crystal molecules 962 in the vicinity of the linear electrodes 924k are aligned parallel to the directions in which the linear electrodes 924k extend, whereas the liquid crystal molecules 962 in the vicinity of the trunk electrode 924j are aligned parallel to the directions in which the trunk electrode 924j extends. Therefore, the luminance in the vicinity of the linear electrodes 924k is relatively high, whereas the luminance in the vicinity of the trunk electrode 924j is relatively low. With the liquid crystal display device 900 in such a state, even when the size of the trunk electrode 924j is decreased in accordance with the decrease in the size of the pixel electrode 924, the size of the trunk electrode 924j cannot be decreased to a level less than the production limit. Therefore, the ratio of the area in the vicinity of the trunk electrode 924j of the lower luminance is increased, and so the luminance of the liquid crystal display device 900 is significantly lowered.

By contrast, in the liquid crystal display device 100D, the trunk electrodes 124aj and 124bj extend only in the y direction and do not extend in the x direction. Therefore, with the liquid crystal display device 100D, even when the size of the pixel area is decreased, the ratio of the area of the trunk electrode with respect to the pixel area is low, and so the liquid crystal display device 100D can suppress the reduction in the luminance.

Figure 16:
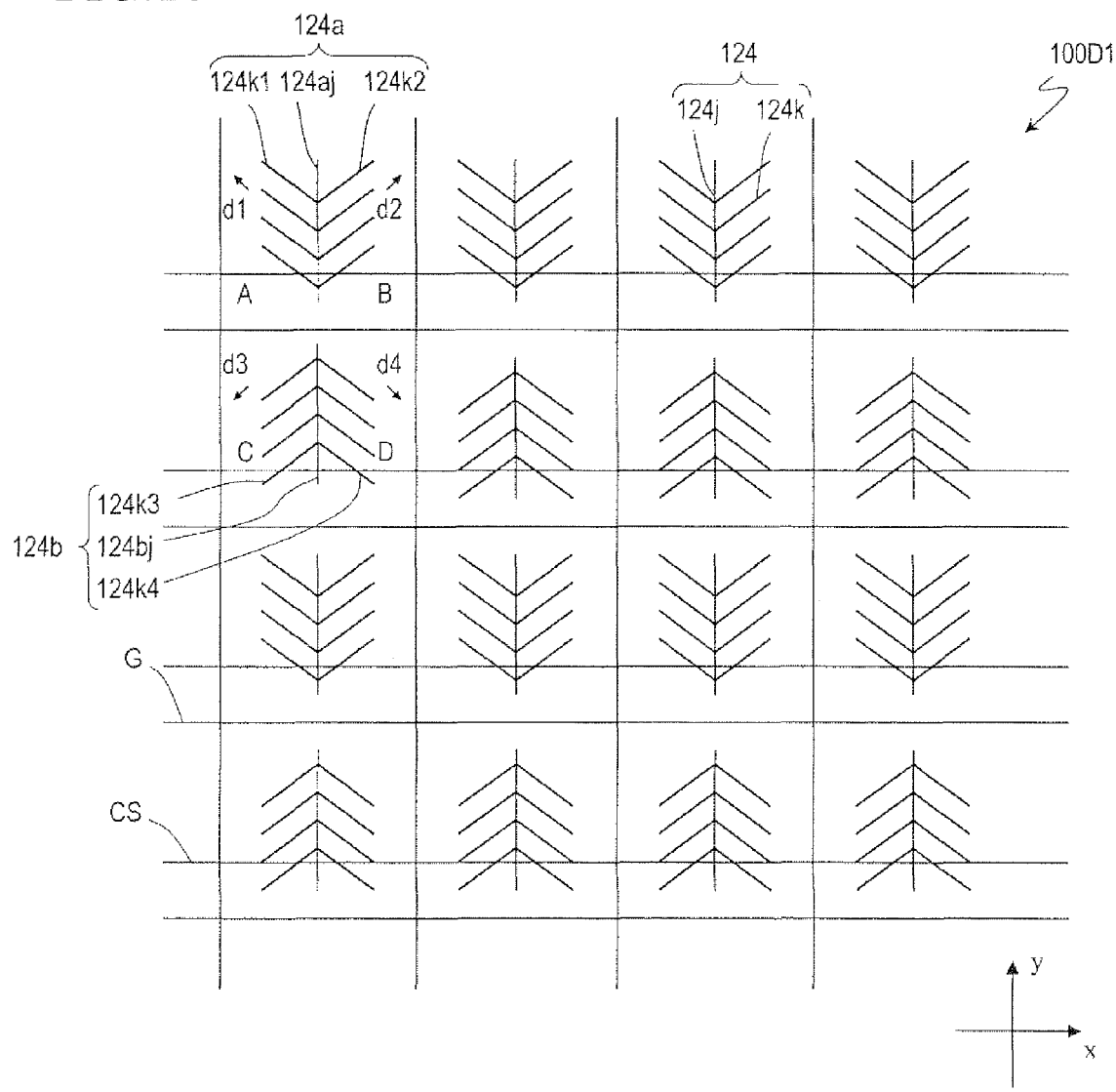
FIG. 16 is a schematic view showing lines in the liquid crystal display device shown in FIG. 14.

In the liquid crystal display device 900 in Comparative Example 2, symmetrical viewing angle characteristics are realized in each pixel. By contrast, in the liquid crystal display device 100D, symmetrical viewing angle characteristics are realized in every other pixels. Therefore, with the liquid crystal display device 100D, when, for example, special display of lighting up only the pixels of the odd-numbered rows and not lighting up the pixels of the even-numbered rows is provided, the viewing angle characteristics may not be sufficiently improved occasionally. However, when a general image is displayed, the display quality of the liquid crystal display device 100D is not lowered. In the liquid crystal display device 900 in Comparative Example 2, it is preferable that the storage capacitance lines CS are each provided along the centers of the pixel electrodes 924 so as to overlap a portion of the trunk electrode 924j extending in the x direction. By contrast, in the liquid crystal display device 100D, the trunk electrodes 124j do not have a portion extending in the x direction. Therefore, the storage capacitance lines CS may be each provided at any position between gate lines G adjacent to each other. As shown in FIG. 16, in a liquid crystal display device 100D1, the storage capacitance lines CS may be each provided so as to overlap portions, other than the centers, the pixel electrodes 124.

In the above description, the four different reference alignment directions of the liquid crystal molecules 162 are realized by the two pixel electrodes 124, but the present invention is not limited to this. The four different reference alignment directions of the liquid crystal molecules 162 may be realized by four pixel electrodes.

Figure 17:
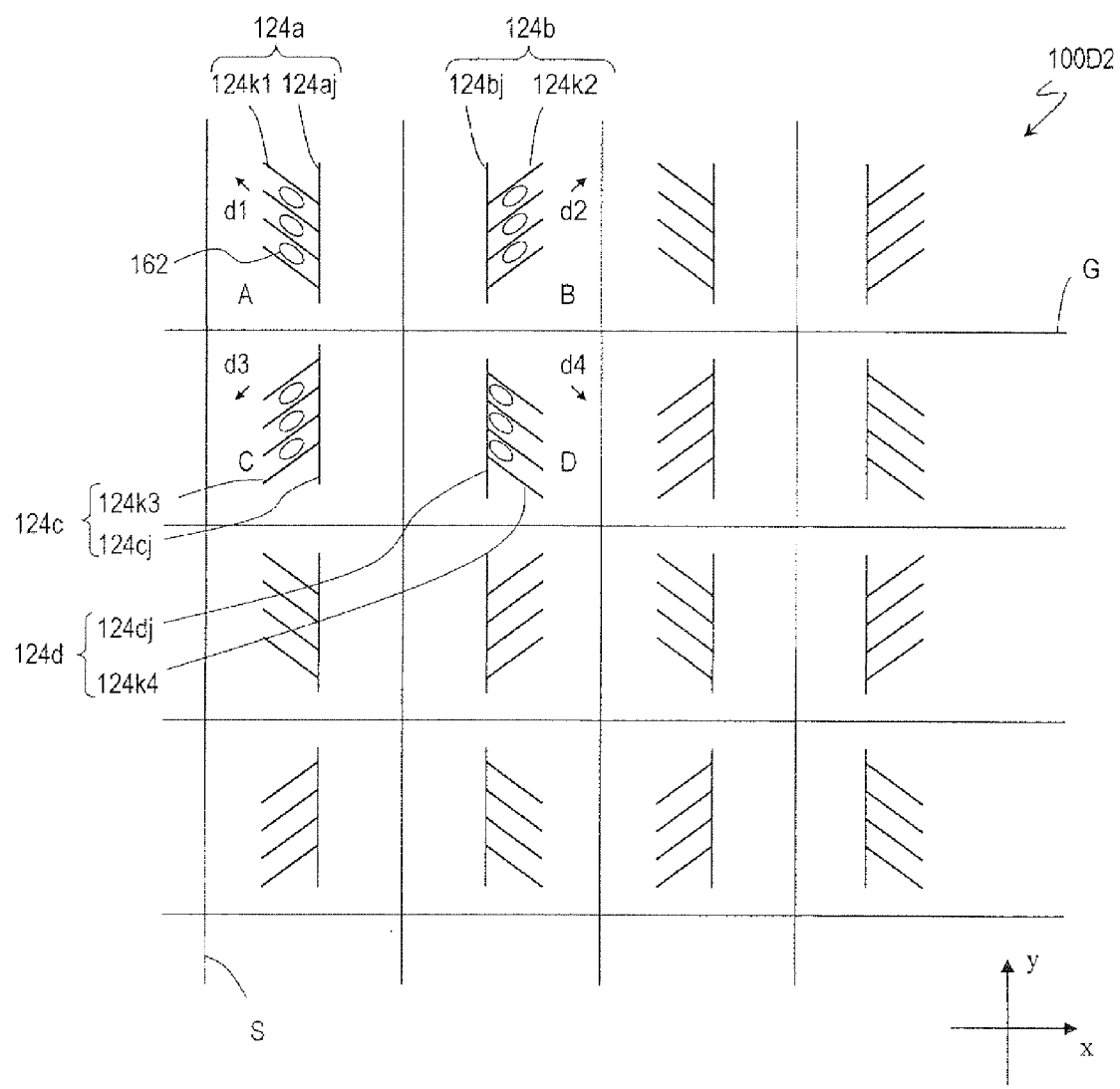
FIG. 17 is a schematic view of a liquid crystal display device in a modified example of Embodiment 4.

Hereinafter, with reference to FIG. 17, a liquid crystal display device 100D2 will be described. In FIG. 17, four pixel electrodes arranged in two rows by two columns are respectively represented as pixel electrodes 124a through 124d. The pixel electrode 124b is generally line-symmetrical to the pixel electrode 124a with respect to the y axis direction, and the pixel electrode 124c is generally line-symmetrical to the pixel electrode 124a with respect to the x axis direction. The pixel electrode 124d is generally point-symmetrical to the pixel electrode 124a.

The pixel electrode 124a includes a trunk electrode 124aj and a plurality of linear electrodes 124k1 extending parallel to each other in the direction d1 from the trunk electrode 124aj. The pixel electrode 124b includes a trunk electrode 124bj and a plurality of linear electrodes 124k2 extending parallel to each other in the direction d2, crossing perpendicularly the direction d1, from the trunk electrode 124bj. The pixel electrode 124c includes a trunk electrode 124cj and a plurality of linear electrodes 124k3 extending parallel to each other in the direction d3, antiparallel to the direction d2, from the trunk electrode 124cj. The pixel electrode 124d includes a trunk electrode 124dj and a plurality of linear electrodes 124k4 extending parallel to each other in the direction d4, antiparallel to the direction d1, from the trunk electrode 124dj.

In the liquid crystal display device 100D2, the liquid crystal layer 160 includes a liquid crystal domain A formed by the pixel electrode 124a, a liquid crystal domain B formed by the pixel electrode 124b, a liquid crystal domain C formed by the pixel electrode 124c, and a liquid crystal domain D formed by the pixel electrode 124d. When a voltage is applied to the liquid crystal layer 160, the liquid crystal molecules 162 corresponding to the pixel electrode 124a are aligned in the direction d1, and the liquid crystal molecules 162 corresponding to the pixel electrode 124b are aligned in the direction d2. Similarly, the liquid crystal molecules 162 corresponding to the pixel electrode 124c are aligned in the direction d3, and the liquid crystal molecules 162 corresponding to the pixel electrode 124d are aligned in the direction d4. The liquid crystal molecules 162 are aligned around the center of an area surrounded by pixel areas defined by the pixel electrodes 124a through 124d as the center. In the liquid crystal display device 100D2, the center of alignment is at the center of the area surrounded by the pixel areas defined by the pixel electrodes 124a through 124d. In this manner, the liquid crystal molecules 162 are aligned in the four different directions d1 through d4, and owing to this, the viewing angle characteristics are improved.

The disclosure of Japanese Patent Application No. 2009-4093, based upon which the present application claims the benefit of priority, is incorporated herein by reference.

INDUSTRIAL APPLICABILITY

The present invention can provide a liquid crystal display device realizing a high luminance. Such a liquid crystal display device is preferably usable for mobile phones and game machines.

REFERENCE SIGNS LIST

100 Liquid crystal display device
120 Active matrix substrate
122 Insulating plate
124 Pixel electrode
140 Counter substrate
142 Insulating plate
144 Counter electrode
150 Axis symmetrical liquid crystal domain formation portion
152 Convexed portion
154 Electrode-absent portion
160 Liquid crystal layer
162 Liquid crystal molecules

The invention claimed is:

1. A liquid crystal display device, comprising:
an active matrix substrate including a plurality of pixel electrodes provided in a matrix of a plurality of rows by a plurality columns;
a counter substrate including a counter electrode;
a vertical alignment type liquid crystal layer provided between the active matrix substrate and the counter substrate; and
a plurality of axis-symmetrical liquid crystal domain formation portions each for forming a liquid crystal domain in which liquid crystal molecules in the liquid crystal layer are aligned in axis symmetry, the plurality of axis-symmetrical liquid crystal domain formation portions each being located at a center of the respective liquid crystal domain;
wherein:
the plurality of pixel electrodes each define a pixel area;
at least one axis-symmetrical liquid crystal domain formation portion among the plurality of axis-symmetrical liquid crystal domain formation portions is provided in correspondence with an area between two pixel areas defined by two pixel electrodes adjacent to each other among the plurality of pixel electrodes or in correspondence with an area surrounded by four pixel areas defined by four pixel electrodes arranged in two rows by two columns among the plurality of pixel electrodes; and
wherein the plurality of axis-symmetrical liquid crystal domain formation portions include a plurality of convexed portions provided on a liquid crystal layer side of at least one of the active matrix substrate and the counter substrate, or a plurality of electrode-absent portions provided in at least one of the counter electrode and the two or four pixel electrodes among the plurality of pixel electrodes.

2. The liquid crystal display device of claim 1, wherein the plurality of convexed portions are provided on the liquid crystal layer side of at least one of the active matrix substrate and the counter substrate.

3. The liquid crystal display device of claim 1, wherein the plurality of electrode-absent portions are provided in at least one of the counter electrode and the plurality of pixel electrodes.

4. The liquid crystal display device of claim 1, wherein at least one axis-symmetrical liquid crystal domain formation portion among the plurality of axis-symmetrical liquid crystal domain formation portions is provided in correspondence with an area surrounded by four pixel areas defined by four pixel electrodes arranged in two rows by two columns among the plurality of pixel electrodes.

5. The liquid crystal display device of claim 1, wherein:
the plurality of pixel electrodes include first, second and third pixel electrodes sequentially arranged in a prescribed direction; and
the plurality of axis-symmetrical liquid crystal domain formation portions include a first axis-symmetrical liquid crystal domain formation portion provided in correspondence with an area between two pixel areas defined by the first pixel electrode and the second pixel electrode, and a second axis-symmetrical liquid crystal domain formation portion provided in correspondence with an area between two pixel areas defined by the second pixel electrode and the third pixel electrode.

6. The liquid crystal display device of claim 1, wherein:
the plurality of pixel electrodes include first, second, third, fourth, fifth and sixth pixel electrodes arranged in three rows by two columns; and
the plurality of axis-symmetrical liquid crystal domain formation portions include a first axis-symmetrical liquid crystal domain formation portion provided in correspondence with an area surrounded by four pixel areas defined by the first, second, third and fourth pixel electrodes, and a second axis-symmetrical liquid crystal domain formation portion provided in correspondence with an area surrounded by four pixel areas defined by the third, fourth, fifth and sixth pixel electrodes.

7. The liquid crystal display device of claim 1, wherein the at least one axis-symmetrical liquid crystal domain formation portion overlaps each of the two pixel electrodes or each of the four pixel electrodes by 9 μm or more.

8. The liquid crystal display device of claim 1, wherein:
the pixel areas respectively defined by the plurality of pixel electrodes each include a transmissive region and a reflective region;
in the two pixel areas or the four pixel areas, one type of regions among the transmissive regions and the reflective regions are provided so as to face each other; and
the at least one axis-symmetrical liquid crystal domain formation portion is provided in correspondence with an area between the two pixel areas or an area surrounded by the four pixel areas.

9. A liquid crystal display device, comprising:
an active matrix substrate including a plurality of pixel electrodes provided in a matrix of a plurality of rows by a plurality columns;
a counter substrate including a counter electrode;
a vertical alignment type liquid crystal layer provided between the active matrix substrate and the counter substrate; and
a plurality of axis-symmetrical liquid crystal domain formation portions each for forming a liquid crystal domain in which liquid crystal molecules in the liquid crystal layer are aligned in axis symmetry, the plurality of axis-symmetrical liquid crystal domain formation portions each being located at a center of the respective liquid crystal domain;
wherein:
the plurality of pixel electrodes each define a pixel area; and
at least one axis-symmetrical liquid crystal domain formation portion among the plurality of axis-symmetrical liquid crystal domain formation portions is provided in correspondence with an area between two pixel areas defined by two pixel electrodes adjacent to each other among the plurality of pixel electrodes or in correspondence with an area surround by four pixel area defined by four pixel electrodes arranged in two rows by two columns among the plurality of pixel electrodes;
wherein at least one axis-symmetrical liquid crystal domain formation portion among the plurality of axis-symmetrical liquid crystal domain formation portions is provided in correspondence with an area between two pixel areas defined by two pixel electrodes adjacent to each other among the plurality of pixel electrodes.

10. The liquid crystal display device of claim 9, wherein the two pixel areas are adjacent to each other in the column direction.

11. A liquid crystal display device, comprising:
an active matrix substrate including a plurality of pixel electrodes provided in a matrix of a plurality of rows by a plurality columns;
a counter substrate including a counter electrode;

a vertical alignment type liquid crystal layer provided between the active matrix substrate and the counter substrate; and a plurality of axis-symmetrical liquid crystal domain formation portions each for forming a liquid crystal domain in which liquid crystal molecules in the liquid crystal layer are aligned in axis symmetry, the plurality of axis-symmetrical liquid crystal domain formation portions each being located at a center of the respective liquid crystal domain;

wherein:

the plurality of pixel electrodes each define a pixel area; and at least one axis-symmetrical liquid crystal domain formation portion among the plurality of axis-symmetrical liquid crystal domain formation portions is provided in correspondence with an area between two pixel areas defined by two pixel electrodes adjacent to each other among the plurality of pixel electrodes or in correspondence with an area surrounded by four pixel areas defined by four pixel electrodes arranged in two rows by two columns among the plurality of pixel electrodes;

wherein the active matrix substrate further includes gate lines extending parallel to the plurality of rows.

12. The liquid crystal display device of claim 11, wherein the gate lines are each provided between the pixel electrodes of two rows adjacent to each other among the plurality of rows.

13. The liquid crystal display device of claim 11, wherein the active matrix substrate further includes storage capacitance lines extending parallel to the plurality of rows.

14. The liquid crystal display device of claim 13, wherein one type of lines among the gate lines and the storage capacitance lines are each provided between the pixel electrodes of two rows adjacent to each other among the plurality of rows.

15. The liquid crystal display device of claim 14, wherein the other type of lines among the gate lines and the storage capacitance lines each overlap the pixel electrodes of one of the two rows.

16. The liquid crystal display device of claim 15, wherein the other type of lines each overlap centers of the pixel electrodes of the one of the two rows.

17. The liquid crystal display device of claim 15, wherein the other type of lines each overlap portions, other than the centers, of the pixel electrodes of the one of the two rows.

* * * * *